US009665249B1

(12) United States Patent
Ding et al.

(10) Patent No.: US 9,665,249 B1
(45) Date of Patent: May 30, 2017

(54) APPROACHES FOR CONTROLLING A COMPUTING DEVICE BASED ON HEAD MOVEMENT

(71) Applicant: Amazon Technologies, Inc., Reno, NV (US)

(72) Inventors: Yi Ding, Santa Clara, CA (US); Stephen Vincent Mangiat, San Francisco, CA (US); Peter Cheng, Sunnyvale, CA (US); Kenneth Mark Karakotsios, San Jose, CA (US); Steven Michael Sommer, Bellevue, WA (US); Peter Andrew Schiller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 14/537,435

(22) Filed: Nov. 10, 2014

(51) Int. Cl.
*G06F 17/00* (2006.01)
*G06F 3/0484* (2013.01)

(52) U.S. Cl.
CPC .................. *G06F 3/0484* (2013.01)

(58) Field of Classification Search
CPC ........................................ G06F 3/0484
See application file for complete search history.

(56) References Cited

U.S. PATENT DOCUMENTS

| 4,722,601 | A * | 2/1988 | McFarlane | F41G 3/225 345/8 |
| 7,797,644 | B1 * | 9/2010 | Bhojan | G06F 3/0489 715/816 |
| 8,631,355 | B2 * | 1/2014 | Murillo | G06F 3/017 715/863 |
| 8,878,773 | B1 * | 11/2014 | Bozarth | G06K 9/00604 345/156 |
| 9,179,061 | B1 * | 11/2015 | Kraft | G06T 15/08 |
| 2010/0125816 | A1 * | 5/2010 | Bezos | G06F 1/1626 715/863 |

OTHER PUBLICATIONS

Pouke et al., "Gaze Tracking and Non-Touch Gesture Based Interaction Method for Mobile 3D Virtual Spaces" Nov. 2012, Melbourne Australia, OZCHI'12 copyright 2012 ACM, p. 505-512.*
Baudel, et al., "Charade: Remote Control of Objects Using Free-Hand Gestures" Communications of the ACM, Jul. 1993, vol. 36, No. 7, p. 28-35.*

* cited by examiner

*Primary Examiner* — Amelia Tapp
(74) *Attorney, Agent, or Firm* — Pierce Atwood LLP

(57) ABSTRACT

A computing device can be controlled based on changes in the angle of a user's head with respect to the device, such as due to the user tilting the device and/or the user tilting his head with respect to the device. Such control based on the angle of the user's head can be achieved even when the user is operating the device "off-axis" or when the device is not orthogonal and/or not centered with respect to the user. This can be accomplished by using an elastic reference point that dynamically adjusts to a detected angle of the user's head with respect to the device. Such an approach can account for differences between when the user is changing his natural resting position and/or the resting position of the device and when the user is intending to perform a gesture based on the angle of the user's head relative to the device.

19 Claims, 20 Drawing Sheets

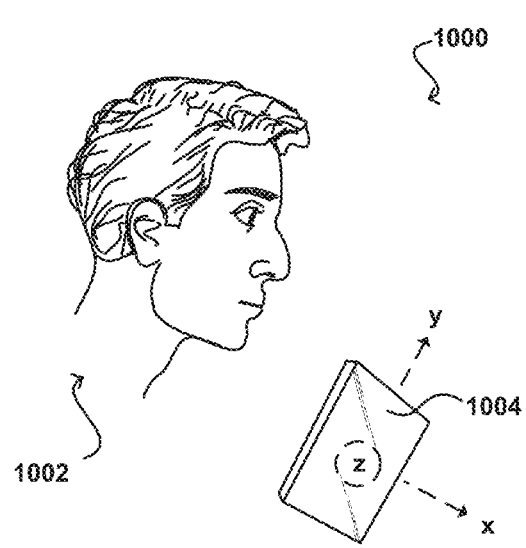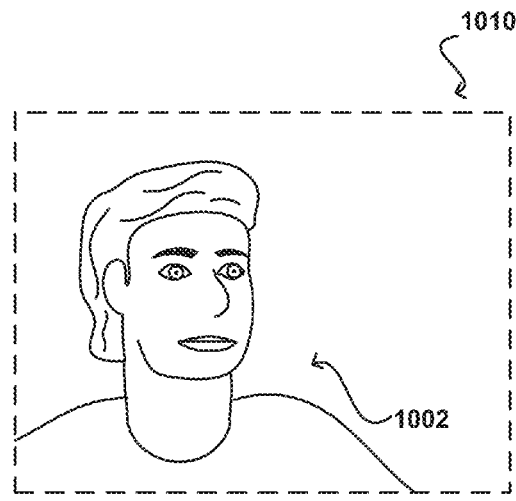
FIG. 10(a)    FIG. 10(b)
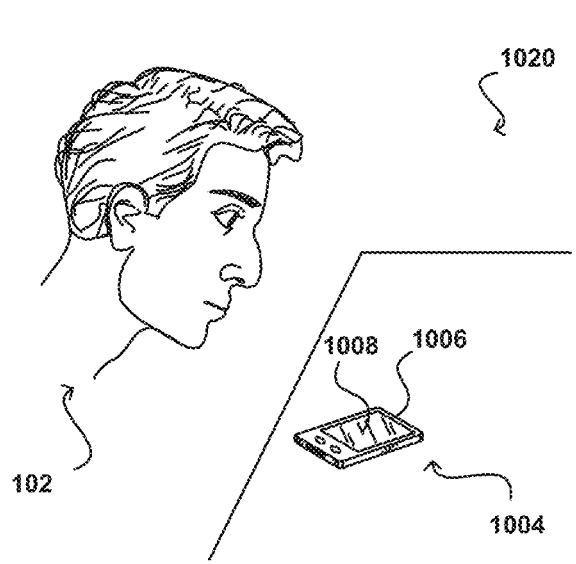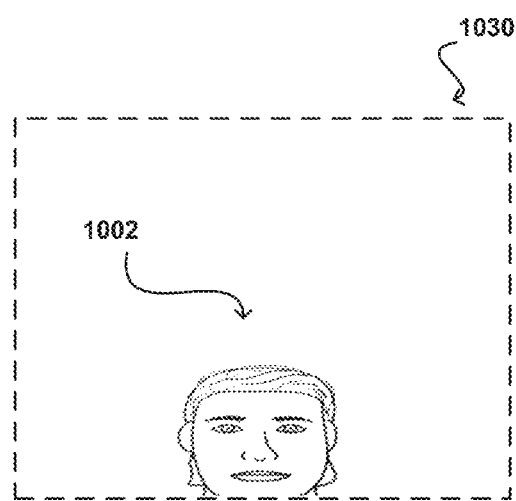
FIG. 10(c)    FIG. 10(d)

APPROACHES FOR CONTROLLING A COMPUTING DEVICE BASED ON HEAD MOVEMENT

BACKGROUND

As computing devices, such as laptops, tablets, or smartphones, become increasingly sophisticated, new and interesting approaches have arisen for enabling such devices to convey information to a user and vice versa. Many such devices typically include a display element (e.g., liquid crystal display (LCD), organic light-emitting diode (OLED), electronic ink (e-ink), etc.) coupled with a touch-sensitive element (e.g., resistive, capacitive, surface acoustic wave, or infrared touchscreen, etc.) that provide for a touch-based interface. This type of interface can improve upon indirect approaches (e.g., mouse, trackpad, pointing stick, etc.) by enabling users to more directly control a computing device. For example, users can perform an action such as starting up a desired application by "clicking" or touching an icon representing the application or responding to a yes-no prompt by clicking or touching an appropriate virtual button instead of using a conventional virtual point-and-click mechanism. As computing devices become more powerful and come equipped with new sensors and other input elements, new approaches can be developed to enable users to more easily control their computing devices.

BRIEF DESCRIPTION OF THE DRAWINGS

Various embodiments in accordance with the present disclosure will be described with reference to the drawings, in which:

FIGS. 10(a)-(d) illustrate example situations of a user operating a computing device as the device is positioned off-axis and/or not centered with respect to the user in accordance with various embodiments;

DETAILED DESCRIPTION

Various embodiments enable a user to control a computing device based at least in part upon the relative position of a user with respect to a computing device. The position of the user with respect to the computing device may be determined, for example, with respect to a relative angle and/or orientation of the user, a direction of the viewing angle of the user, or the angle of the user's head relative to the computing device (e.g., the angle of incidence or a derivation thereof formed by a ray from a point corresponding to the user (e.g., a point between the user's eyes) to a point corresponding to the computing device (e.g., center point of the front surface of the computing device)), among other relative position information.

For example, a first view of content may be presented to a user through a display element of the computing device. There may be additional content, contextual information, or other information that is not immediately displayed on the display element, for example, due to the space limitations of the display element. However, the computing device may enable the user to "peek," "scroll," or perform some other movement to change the angle of the user's head relative to the device to view the additional content. Depending on the implementation, the movement(s) for viewing the additional content can include, for example, tilting the device from a resting position in a leftward direction (e.g., eastward), a rightward direction (e.g., westward), an upward direction (e.g., northward), a downward direction (e.g., southward), an intercardinal or ordinal direction (i.e., northeast (NE), a southeast direction (SE), a southwest direction (SW), a northwest direction (NW)), and/or secondary-intercardinal direction (e.g., NNE, ENE, ESE, etc.), among other possible movements. Alternatively, or in addition, the user may tilt his head in one or more of the aforementioned directions, which can be recognized as input for the computing device to cause the device to perform the desired action.

Figure 1A:
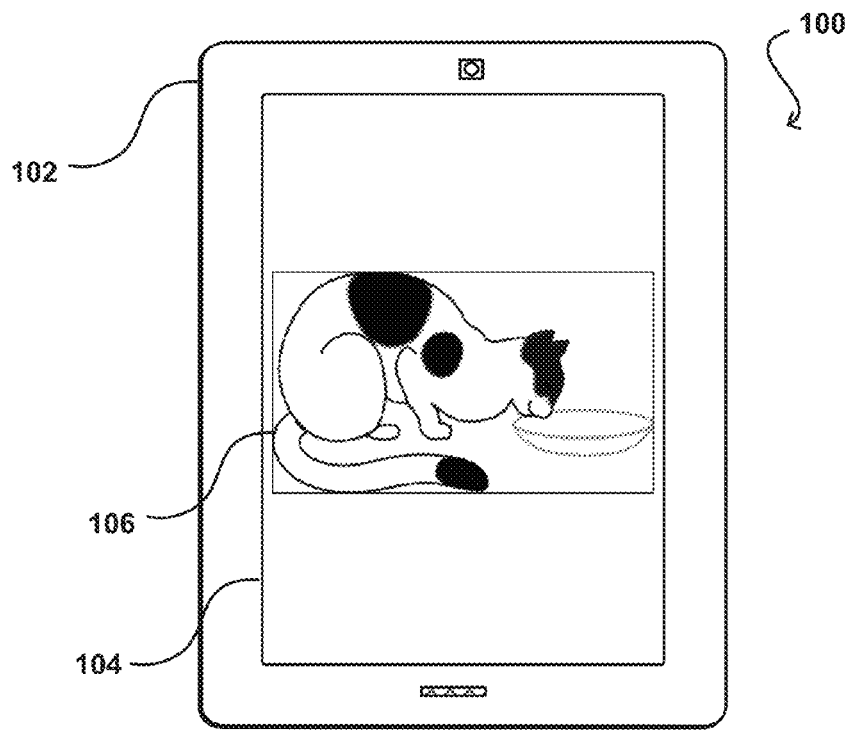
FIGS. 1(a)-(d) illustrates an example approach for accessing additional options for displayed objects based on movement of a user's head with respect to a computing device in accordance with an embodiment.

FIGS. 1(a)-(d) illustrate an example approach for accessing additional options for displayed objects based on the angle of a user's head with respect to the computing device 102 in accordance with an embodiment. In the example situation 100 of FIG. 1(a), a display screen 104 of the computing device 102 is displaying a first view of an object 106 (e.g., an image). For example, the object 106 may be displayed in response to a user operating the computing device 102 accessing data stored on the computing device 102, a website using a browser, or a message (e.g., text message or e-mail) using an application executing on the computing device 102. As shown, in the first view, the object 106 is presented as-is without additional content related to the object 106. In the example of FIG. 1(a), the object 106 is an image and therefore the image is presented without additional content (e.g., overlays). Although an image is used in this example, the approaches described herein can be applied to other types of objects including, for example, displayed videos or images corresponding to videos, graphical images or interfaces describing sounds or music, messages (e.g., text messages or e-mails), icons, some specified region or boundary on the display screen that is actionable using the approaches described herein, etc.

Figure 1B:
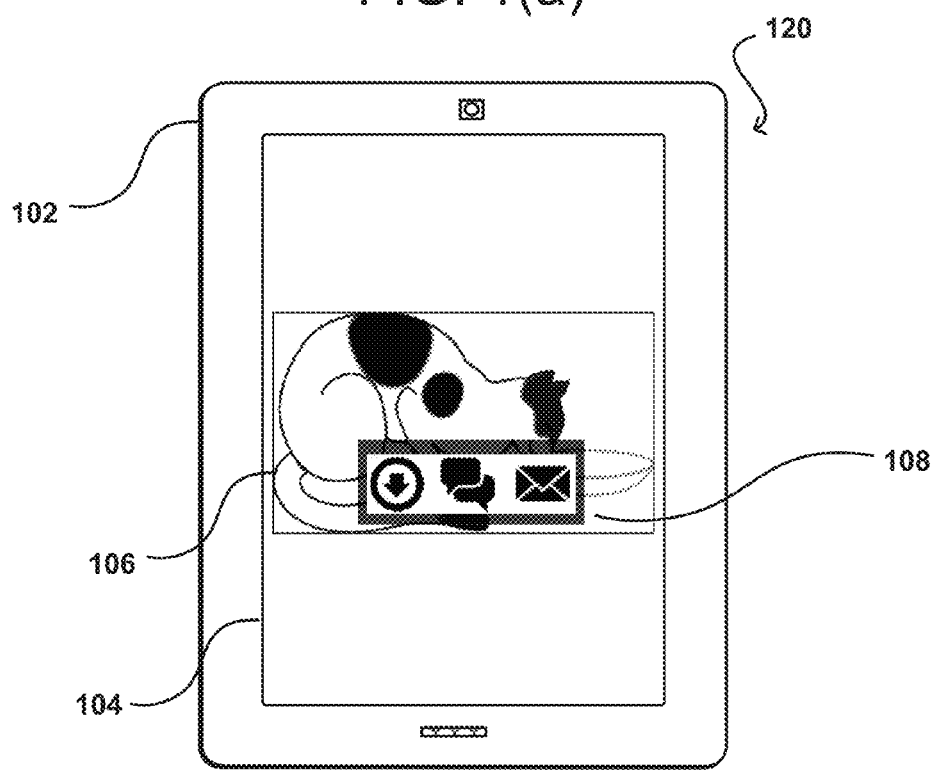

FIG. 1(b) illustrates an example situation 120 in which the user operating the computing device has performed a "peek" gesture. As described in this specification, the peek gesture can be triggered, for example, in response to a change in the angle of the user's head relative to the computing device 102 satisfying various thresholds. When the peek gesture is detected by the computing device 102, the computing device 102 can perform various actions including, for example, displaying additional content on the display screen 104.

In some embodiments, in response to detecting the peek gesture, the computing device 102 displays options (e.g., actions) that are associated with objects that are being displayed on the display screen 104. As shown in the example of FIG. 1(b), in response to detecting the peek gesture, the computing device displays an overlay 108 of options that can be performed on object 106. Some examples of options that can be performed on objects include downloading the object, sending the object to someone, for example, in a message (e.g., text message or e-mail), and/or sharing the object through a social networking platform. Depending on the implementation, the overlay 108 may be sized so that it is overlaid within the bounds of the displayed object 106, as shown in the example of FIG. 1(b), or the overlay 108 may be permitted to exceed the bounds of the displayed object 106.

In some embodiments, the computing device 102 can be configured to determine a respective type for any objects being displayed and then display any options that can be performed on those objects based on the object type. For example, a displayed object may be a file (e.g., document) that can be opened using a particular software application. In this example, the computing device 102 can determine the type of the object and any software applications available (e.g., installed) on the computing device 102 that are able to open that object. Upon detecting the peek gesture, the computing device 102 can then include an option for opening the object using the particular software application. In instances where the software application is not available on the computing device 102, then the computing device 102 can allow the user operating the computing device 102 to automatically install (e.g., download from an application store) the software application upon selecting the displayed option. In some embodiments, a user can customize which options are presented with respect to certain types of objects.

As described in this specification, the peek gesture can be performed in different directions. For example, a left peek may be detected in response to a left movement of the user's head relative to the computing device 102. Similarly, a right peek may be detected in response to a right movement of the user's head relative to the computing device 102. In some embodiments, the position in which the overlay 108 is displayed with respect to the object 106 is based on the direction in which the user's head moves with respect to the computing device 102. For example, if the user operating the computing device 102 performs a left peek, then the overlay 108 can be aligned to the bottom right boundary of the object 106. In some embodiments, the computing device 102 can display different sets of options depending on the movement direction of the user's head with respect to the computing device 102. For example, if the user operating the computing device 102 performs a left peek, then a first set of options can presented for the object 106. Similarly, if the user operating the computing device 102 performs a right peek, then a second set of options can presented for the object 106.

Once the computing device 102 determines that the peek gesture is no longer detected, the computing device 102 can remove any options presented for objects displayed on the display screen. Thus, in the example of FIG. 1(b), once the computing device 102 determines that the peek gesture is no longer being performed, the overlay 108 can be removed and the object 106 is displayed as shown in FIG. 1(a). In some embodiments, a time threshold is used to control when the overlay 108 is displayed or removed. For example, a peek gesture may need to be detected for a period of two seconds before the overlay 108 is presented. Similarly, the computing device 102 can be configured to wait two seconds after the peek gesture is no longer detected before removing the overlay 108 from the display screen 106.

In some instances, the computing device 102 may be displaying multiple objects for which options are to be displayed upon the computing device 102 detecting the peek gesture. For example, as illustrated in the example situation 140 of FIG. 1(c), the display screen 104 of the computing device 102 is displaying the objects 110 and 112. As described, upon detecting a peek gesture, the computing device 102 can display respective overlays of options that can be performed with respect to the objects 110 and 112. However, when multiple objects (e.g., images) are displayed on the display screen 104, showing overlays of options for each object may clutter the interface.

Figure 1C:
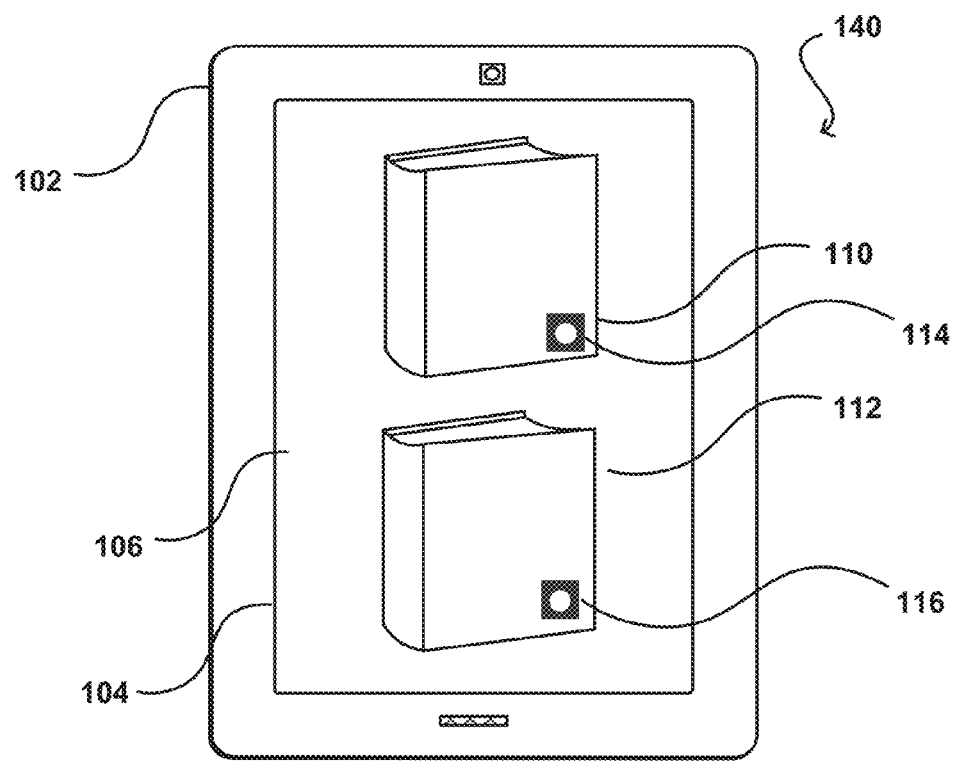

Thus, in some embodiments, when multiple objects are displayed, the computing device 102 can display a minimized set of options (e.g., a single option) when a peek gesture is detected. As illustrated in FIG. 1(c), a single option 114 is displayed for object 110 and a single option 116 is displayed for the object 112. The options 114 and 116 are displayed in response to the computing device detecting a peek gesture.

Figure 1D:
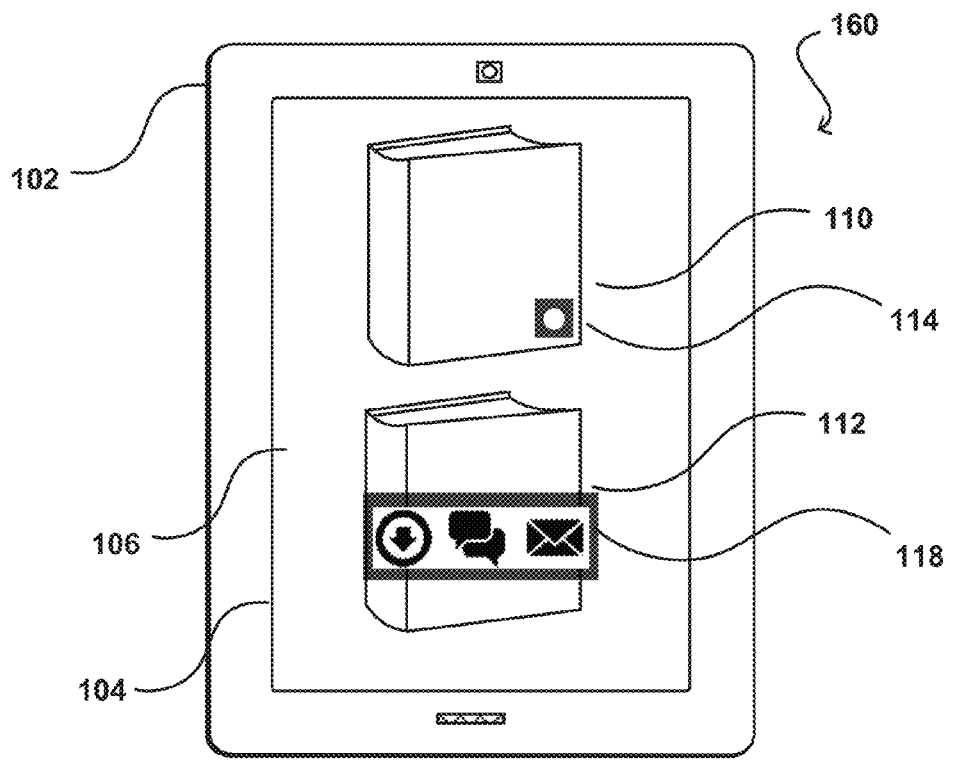

When the minimized set of options for an object is selected, the set of options for that object is expanded (e.g., in a drop down menu) to display all of the options that can be performed with respect to that object. As illustrated in the example situation 160 of FIG. 1(d), the computing device 102 is displaying objects 110 and 112 while detecting a peek gesture (e.g., "peek mode"). In FIG. 1(d), a full set of options 118 is shown for the object 112 in response to the user operating the computing device 102 selecting the single option 116 for the object 112. In contrast, the single option 114 is still displayed for the object 110 since the user has not selected the option 114. By allowing the user to expand and contract the set of options for any given object, the display interface can be better managed.

As mentioned, in FIG. 1(d), the computing device 102 is displaying options for the objects 110 and 112 while detecting a peek gesture. In some embodiments, the user operating the computing device 102 can "lock" the peek gesture so that the display screen 106 will continue to display the additional content as if a peek gesture were being performed even though the peek gesture is no longer being performed. For example, while in peek mode, the user operating the computing device 102 can touch the display screen 106. In response, the computing device 102 can stay in peek mode and, consequently, display the additional content that would be displayed in peek mode, until the user stops touching the display screen 106 even though a peek gesture is no longer detected. In another example, while in peek mode, the user operating the computing device 102 can touch the display screen 106. In response, the computing device 102 can stay in peek mode for a predetermined amount of time and can display the additional content that would be displayed in peek mode for the predetermined amount of time even though a peek gesture is no longer detected.

Reference numbers for similar elements are carried over between figures throughout this specification for ease of explanation, but it should be understood that this is merely done as a matter of convenience and not intended to be a limitation on the various embodiments. Further, the examples herein utilize the peek gesture, but it should be understood that the approaches described herein can also be implemented using other approaches (e.g., head tracking) or gestures, such as swivel, tilt, shake, or any other gesture that a device has been configured to recognize using the approaches described in this specification.

Figure 2A:
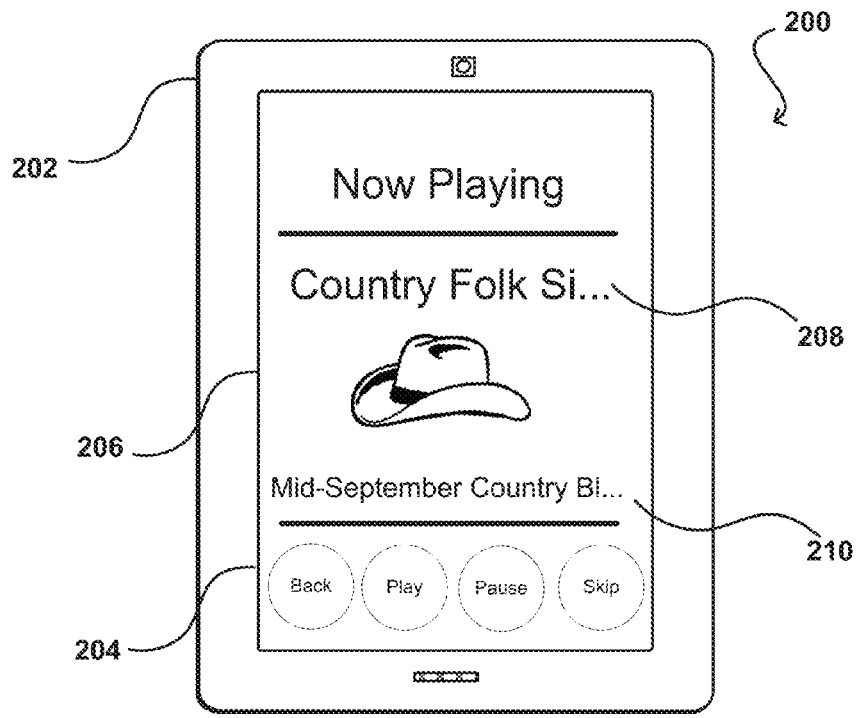
FIGS. 2(a)-(b) illustrate an example approach for viewing additional content based on movement of a user's head with respect to a computing device in accordance with an embodiment.
Figure 2B:
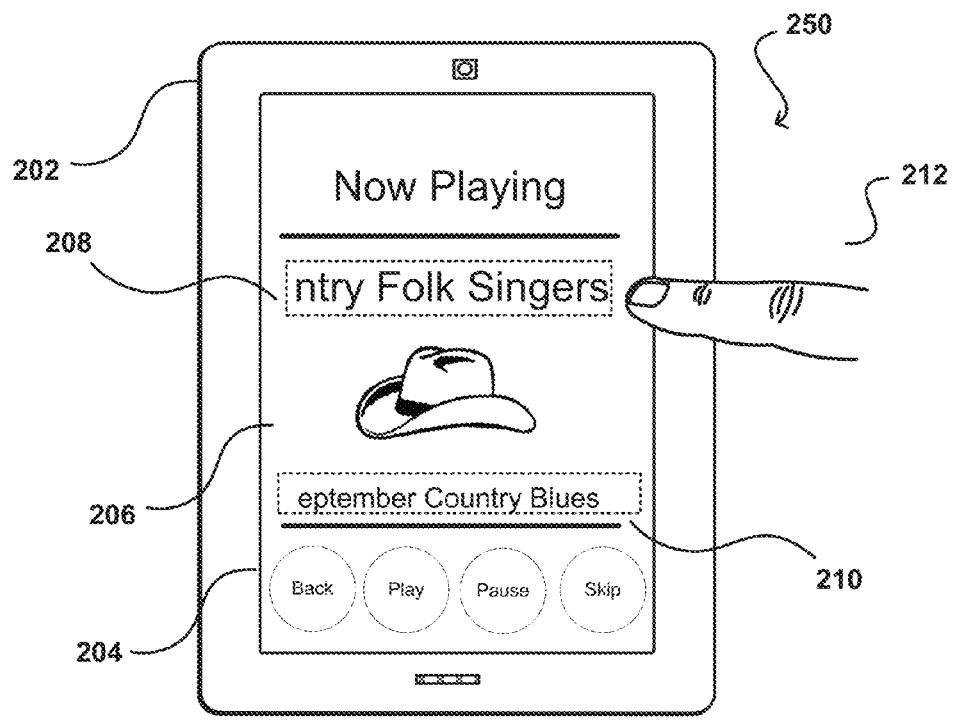

FIG. 2(a)-(b) illustrate an example approach for viewing additional content based on movement of a user's head with respect to a computing device 202 in accordance with an embodiment.

In the example situation 200 of FIG. 2(a), a display screen 204 of the computing device 202 is displaying a first view of content 206 (e.g., a music play interface). The content 206 includes a first string of text 208 (e.g., "Country Folk Si . . . ") and a second string of text 210 (e.g., "Mid-September Country Bl . . . "). In the example of FIG. 2(a), the first and second strings of text 208 and 210 are too long to be displayed on the display screen 204 in full. In such instances, a marquee technique can be used to scroll the long strings of text across the display screen 204 (e.g., scroll the text from right to left) so that each portion of the strings of text can be displayed at any given time. For example, the text "United States of America" may be too long to display on an interface that is able to display up to eight characters at a time. In this example, the text can be displayed as marquee text that displays "United S," then scrolls left to display "tates of," and then scrolls left to display "America." The marquee feature can operate to display strings of text in a manner that is similar to how text is displayed using the "<marquee>" HTML tag. Use of the marquee feature may not always be desired by users, however, since the scrolling of text can be distracting, especially when multiple strings of displayed text are scrolling at any given time.

Thus, in some embodiments, the computing device 202 is configured to marquee text being displayed on the display screen 204 in response to detecting a peek gesture. As described in this specification, the peek gesture can be triggered, for example, in response to a change in the angle of the user's head relative to the computing device 202 satisfying various thresholds. When the peek gesture is detected by the computing device 202, the computing device 202 can perform various actions including, for example, scrolling long strings of text displayed on the display screen 204 using the marquee feature.

As shown in the example situation 250 of FIG. 2(b), in response to detecting the peek gesture, the computing device 202 begins automatically scrolling the first and second strings of text 208 and 210 using the marquee feature. In some embodiments, the first and second strings of text 208 and 210 begin to marquee after a predetermined time period has elapsed (e.g., 0 to 3 seconds). Depending on the implementation, when the computing device 202 no longer detects the peek gesture, the first and second strings of text 208 and 210 no longer marquee and display the portions of the first and second strings of text 208 and 210 that were displayed when the marquee stopped. Alternatively, when the computing device 202 no longer detects the peek gesture, the first and second strings of text 208 and 210 can continue to marquee until each of the strings of text 208 and 210 reach the beginning of the strings. In some embodiments, the speed (e.g., rate of acceleration) at which the text scrolls across the display screen 204 is determined based on how far the user has peeked with respect to the computing device 202. For example, the rate of the scrolling may increase as the angle of the user's head relative to the computing device 202 increases. In some embodiments, the speed (e.g., rate of acceleration) at which the text scrolls across the display screen 204 is determined based on the speed at which the user performs the peek gesture. For example, the rate of the scrolling may increase as the angle of the user's head relative to the computing device 202 increases.

In some embodiments, once a peek gesture is detected, the computing device 202 enters a marquee mode. In such embodiments, while in the marquee mode, the first and second strings of text 208 and 210 continue to be displayed as shown in FIG. 2(a). The computing device 202 begins animating a string of text as marquee once a user 212 touches (e.g., taps) the string of text. For example, the user 212 can tap the first string of text 208 and, in response to the tap, the computing device 202 will begin to marquee (e.g., scroll) the first string of text 208. Similarly, the user 212 can tap the second string of text 210 and, in response to the tap, the computing device 202 will begin to marquee (e.g., scroll) the second string of text 210. In some embodiments, while in the marquee mode, the user 212 can manually scroll a string of text by touching a region in which a portion of the string is displayed on the display screen 204 and dragging the user's finger to the left or right of the display screen 204. In some embodiments, upon touching or tapping the display screen during the peek gesture, the user operating the computing device can "lock" the peek gesture so that the text continues to marquee as if a peek gesture were being performed even though the peek gesture is no longer being performed.

Although a music player interface is used in the example of FIGS. 2(a)-(b), the approaches described herein can be generally applied to any type of content that is displayed on the display screen 204.

Figure 3A:
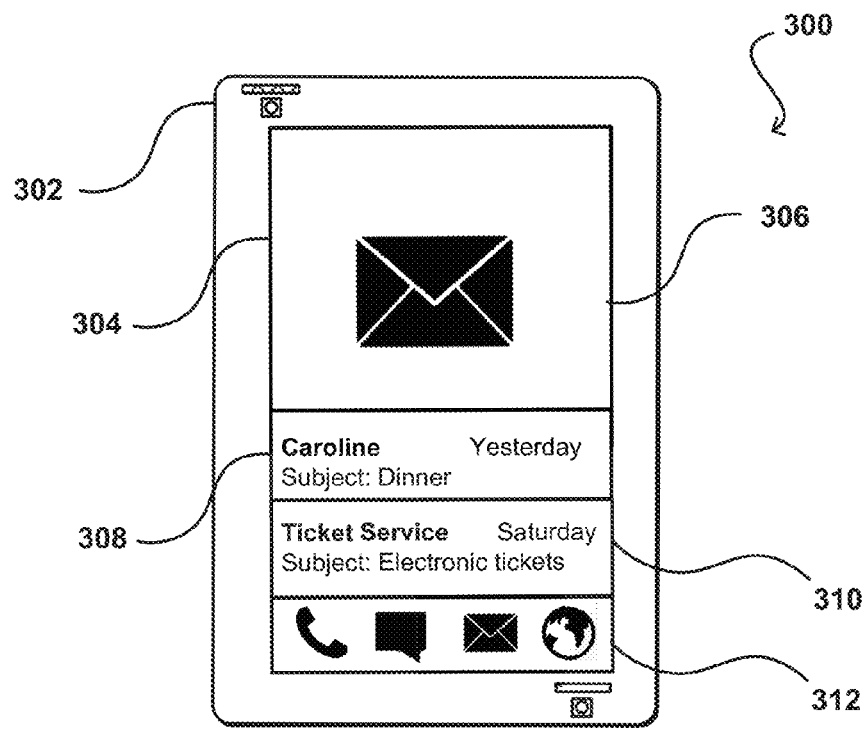
FIGS. 3(a)-(b) illustrate another example approach for viewing additional content based on movement of a user's head with respect to a computing device in accordance with an embodiment.
Figure 3B:
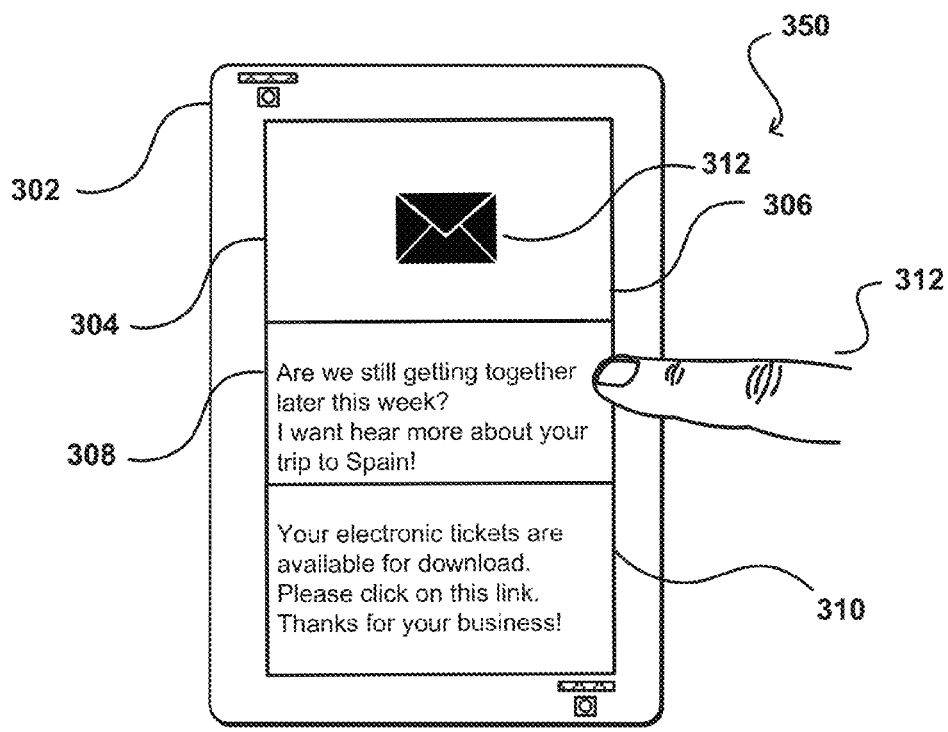

FIG. 3(a)-(b) illustrate another example approach for viewing additional content based on movement of a user's head with respect to a computing device 302 in accordance with an embodiment.

In the example situation 300 of FIG. 3(a), a display screen 304 of the computing device 302 is displaying content 308 and 310 through an interface 306. In this example, the interface 306 is presenting previews of a first email 308 and a second email 310. The previews of the emails 308 and 310 show respective portions (e.g., 1-2 lines) of the emails so that a user can read a portion of the email content without having to open the full email. The interface 306 also includes action icons 312 that correspond to various operations (e.g., making a phone call, accessing a messaging application, accessing an email application, or accessing a web browser).

In some embodiments, the computing device 302 is configured to display, on the display screen 304, an expanded preview of the displayed content 308 and 310 in response to detecting a peek gesture. As illustrated in the example situation 350 of FIG. 3(b), when the peek gesture is detected by the computing device 302, the computing device 302 can increase the amount of content that is shown in the preview of the first and second emails 308 and 310. For example, instead of displaying a preview of an email consisting of two lines of the email, the computing device 302 can display an expanded preview of the email consisting of, for example, four lines of the email. To make room for the increased content, the computing device 302 can hide the action icons 312, as illustrated in the example of FIG. 3(b), or condense other content being displayed on the interface 306 (e.g., the icon 312 or email headers such as sender name and/or subject line).

In some embodiments, when the expanded preview of the displayed content 308 and 310 in shown in response to detecting a peek gesture, a user 312 can manually scroll through an email preview by touching a region in which a portion of the email preview is displayed on the display screen 304 and dragging the user's finger up or down the display screen 304. In some embodiments, once a peek gesture is detected, the computing device 302 enters a preview mode. In such embodiments, while in the preview mode, the previews of the first and second emails 308 and 310 continue to be displayed as shown in FIG. 3(a). However, once a user 312 touches (e.g., taps) a region associated with the first email 308 or the second email 310, the preview of the selected email is expanded. For example, the user 312 can tap the preview of first email 308 in the interface 306 and, in response to the tap, the computing device 302 will expand the preview of the first email 308. In contrast, the preview of the second email 310, which has not been selected, can remain in its original displayed form (e.g., unexpanded form). Similarly, the user 312 can tap the preview of the second email 310 and, in response to the tap, the computing device 302 can display an expanded preview of the second email 310.

Figure 4A:
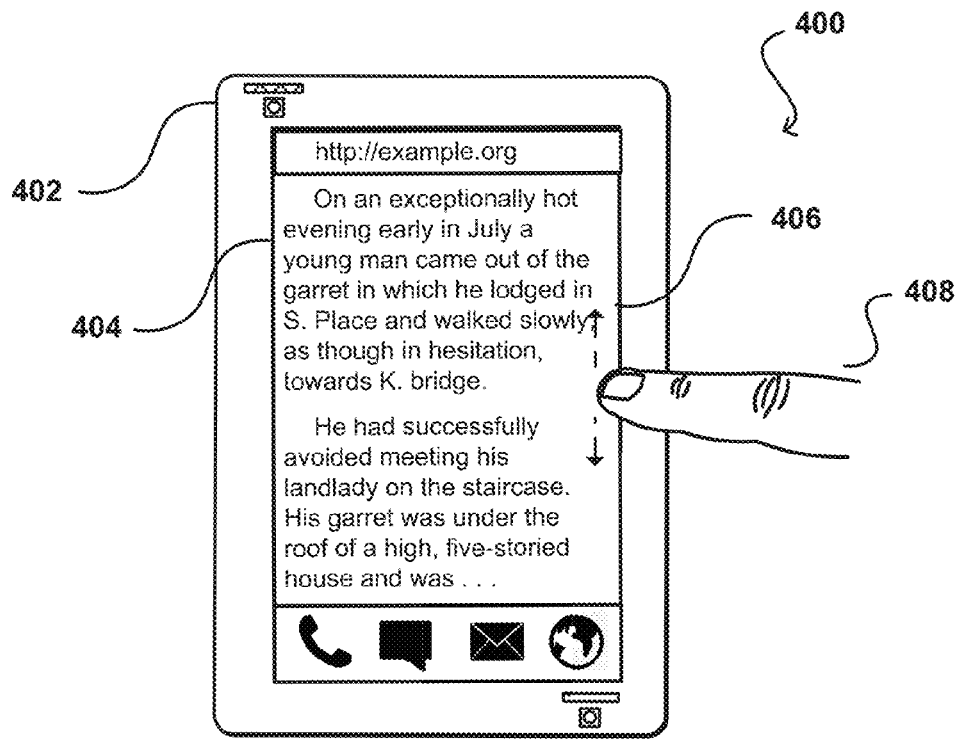
FIGS. 4(a)-(b) illustrate example approaches for interacting with a computing device based on movement of a user's head in accordance with an embodiment.
Figure 4B:
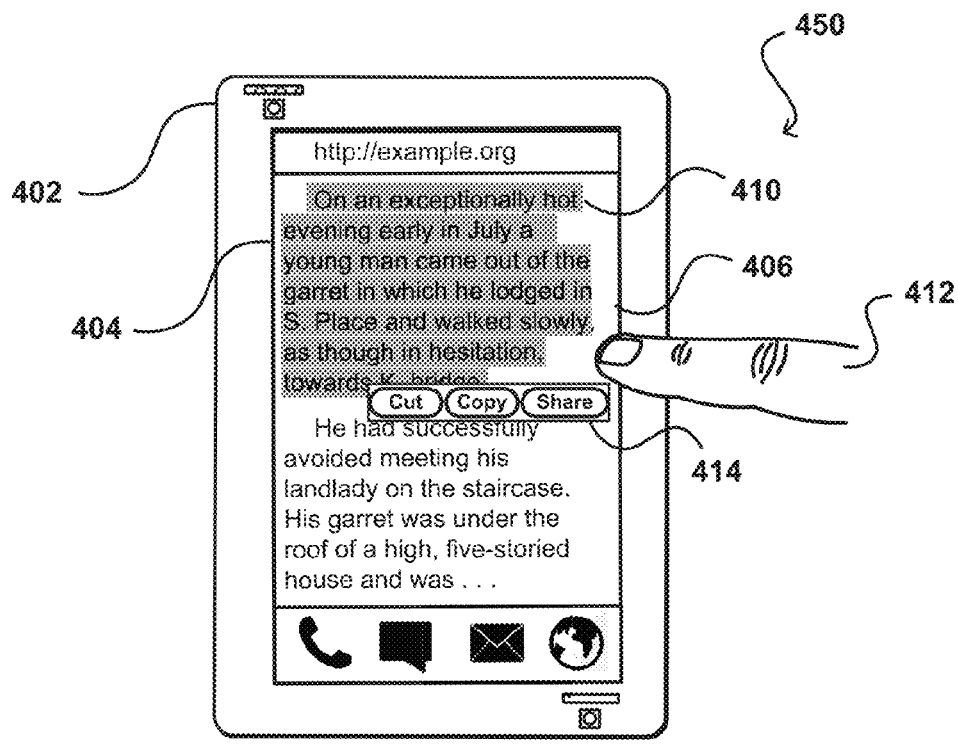

FIGS. 4(a)-(b) illustrate example approaches for interacting with a computing device 402 based on movement of a user's head in accordance with an embodiment.

In the example situation 400 of FIG. 4(a), a display screen 404 of the computing device 402 is displaying content 406. The content 406 can be displayed, for example, through an interface (e.g., email application, web browser, or document viewer). In this example, the computing device 402 is displaying a portion of text 406 through a web browser. In a typical scenario, various gestures that can be performed by the user (e.g., tap, double tap, swivel, tilt, etc.) are each interpreted by the computing device 402 to correspond to a respective operation. Thus, in a typical scenario, a user can interact with the computing device 402, for example, by touching (e.g., tapping) the display screen 404 to scroll the content 406 being displayed. For example, the user can tap and hold the display screen 404 using a finger 408 and can drag the user's finger 408 in an upward or downward direction to scroll the displayed content 406 in that direction, respectively.

In some embodiments, the respective operations that are associated with various gestures in a typical scenario can be replaced with different operations when the computing device 402 detects a peek gesture (e.g., the computing device 402 is in peek mode). Depending on the implementation, these different operations can be predefined or may be customized by the user. Thus, when the peek gesture is detected by the computing device 402, the computing device 402 can enable a different set of respective operations for various gestures.

For example, as illustrated in the example situation 450 of FIG. 4(b), when a peek gesture is detected, a user can interact with the computing device 402, for example, by touching (e.g., tapping) the display screen 404 to select or highlight text 410. Thus, the selecting or highlighting of the text 410 (which may have required a long-press or long-touch (e.g., a tap on the display screen 404 lasting a predetermined period of time)) is a different operation that is performed in response to the user touching the display screen 404, which is in contrast to the typical scenario where the touching of the display screen 404 results in scrolling the content 406.

When the peek gesture is detected, the user can tap and hold the display screen 404 beginning with the portion of text to be selected or highlighted using a finger 412 and can drag the user's finger 412 in an upward or downward direction to select additional text 410 in that direction, respectively. If the user continues to select text that extends past (e.g., on the next page) the content that is being displayed on the display screen 404, then the computing device 402 can automatically scroll downward (or turn the page) to display additional content. In some embodiments, additional options 414 can be displayed for taking action with respect to the text selected by the user 412. For example, the options 414 can allow the user to cut or copy the selected text, or to share the selected text, for example, through email, text message, or by posting to a social networking platform. In some embodiments, when a peek gesture is detected, text selected by a user is automatically copied upon being selected.

In some implementations, once the peek gesture is detected, the computing device 402 can activate a peek mode in which the respective operations that are associated with various gestures in a typical scenario continue to be replaced with the different operations as if the computing device 402 is still detecting the peek gesture. The computing device 402 can remain in peek mode for a predefined period of time. Alternatively, the computing device 402 can engage the peek mode when the computing device 402 detects the peek gesture and when the user touches (e.g., taps) the display screen 404 while the peek gesture is being performed. In some embodiments, the computing device 402 can indicate on the display screen 404 that the computing device 402 is in peek mode so that the user is aware that the different operations are being performed in response to the various gestures.

In another example, when a peek gesture is detected (or when the computing device 402 is in peek mode), a user can touch or tap an application icon to reveal operations that can be performed with respect to that application. For example, when the peek gesture is detected (or when the computing device 402 is in peek mode), the user can touch or tap the display screen 404 to select a game application. In response, the computing device 402 can display options that the user can perform with respect to the game application. These options can include, for example, pinning the game application icon to a favorites task bar (e.g., a carousel), deleting the game application from the favorites task bar, or deleting the game application from the computing device 402.

Figure 5A:
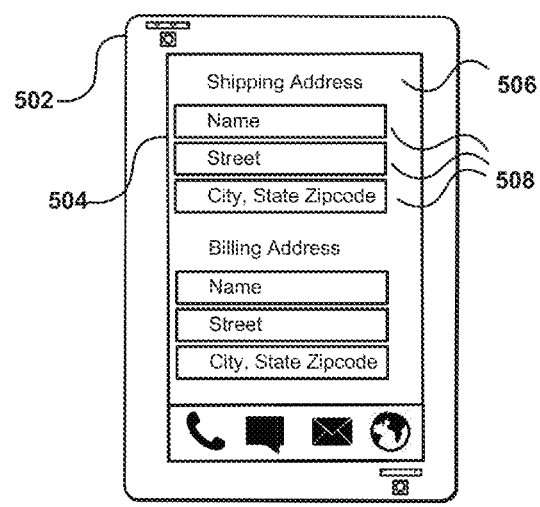
FIGS. 5(a)-(b) illustrate other example approaches for interacting with a computing device based on movement of a user's head in accordance with an embodiment.
Figure 5B:
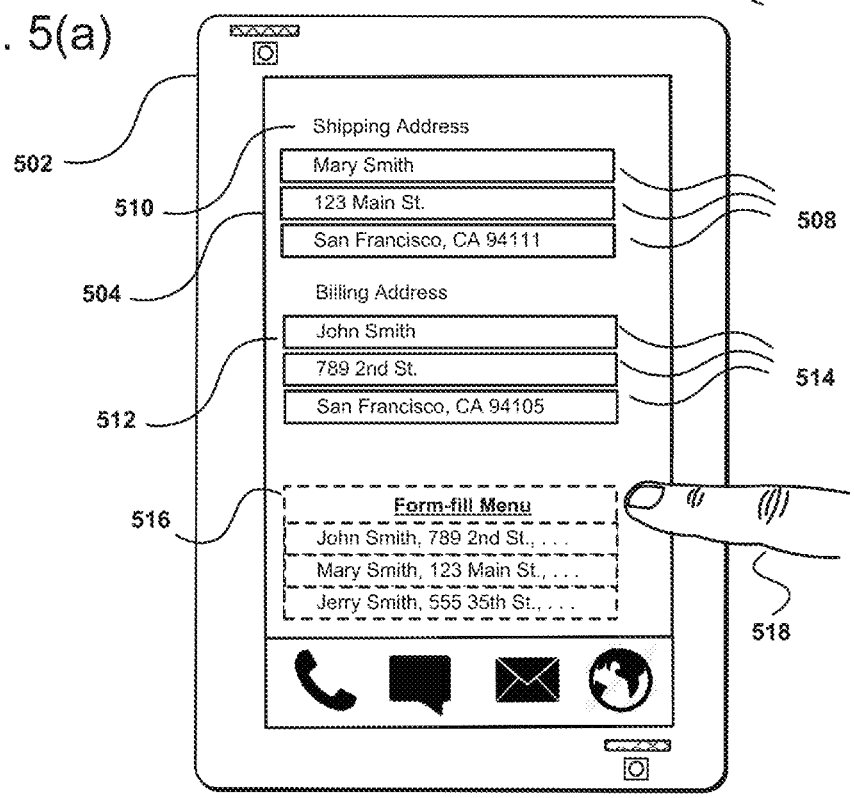

FIGS. 5(a)-(b) illustrate other example approaches for interacting with a computing device 502 based on movement of a user's head in accordance with an embodiment.

In the example situation 500 of FIG. 5(a), a display screen 504 of the computing device 502 is displaying an interface that includes a fillable form 506 (e.g., an web-based form or a graphical user interface such as an email interface, text messaging interface, a graphical editor, etc.) that includes several fields 508 (e.g., text fields) for inputting data into the form 506. A user can interact with the computing device 502 to input data into the text fields 508. For example, the user can select one of the text fields by touching or tapping the text field. In response, the computing device 502 can display, on the display screen 504, a virtual keyboard overlay which the user can utilize to input characters into the text field.

In some instances, data that was previously inputted into the text fields may be stored, for example, on the computing device 502. For example, when the user first fills out the form 506, information that the user entered can be automatically saved as an autofill entry. Some examples of information that can be saved in an autofill entry include a name, address, phone number, email address, and/or credit card information. When the user is subsequently presented with a form having a field that corresponds to a field for which data was previously inputted and saved, the stored data can be populated automatically (e.g., "autofill") in the field.

In some embodiments, the computing device 502 can be configured to not automatically fill the text fields 508 when the form 506 is presented to the user. Instead, when the computing device 502 detects a peek gesture, the computing device 502 can be configured to allow the user to preview the data that can be autofilled in the text fields 508. For example, as illustrated in the example situation 550 of FIG. 5(*b*), when a peek gesture is detected (e.g., while the computing device 502 is in peek mode), the computing device 502 populates autofill data in the text fields 508 so that the user can see what data can be autofilled in each of the text fields 508. The data shown in the preview may be presented on the display screen 504 using, for example, semi-transparent text to signify that the data is being shown as part of an autofill preview and therefore has not actually been populated in the text fields 508. When the peek gesture is no longer detected (e.g., the computing device 502 is no longer in peek mode), the computing device 502 stops displaying the data that can be autofilled in the text fields 508. In other words, the display screen 504 reverts from the display shown in FIG. 5(*b*) to the display shown in FIG. 5(*a*).

As illustrated in FIG. 5(*b*), in some embodiments, while the computing device 502 is in peek mode, the user previewing the data that can be autofilled in the text fields 508 can select 518 (e.g., touch or tap) a text field. In response to the selection, the computing device 502 automatically populates (e.g., autofills) the selected text box field using the data that was previously saved when the user last entered the data in that text box. In some embodiments, while in peek mode, the user is provided with one or more options for entering data into the fields 508. These options may be pre-defined or may be automatically generated depending on the form or context. In one example, the form presented may be a text messaging interface and the user may have received a text message from a sender asking a question. When in peek, the interface may be updated to provide the user with a list of options for various text responses (e.g., "yes," "no," "not sure") which, when selected, will populate or send the corresponding text response to the sender through the text messaging interface.

There may be instances in which the user has multiple autofill entries saved for any number of text fields. To give the user the option to select particular autofill entries for populating the text fields 508, in some embodiments, the computing device 502 displays an autofill menu 516 when the peek gesture is detected. The user can then select one of the entries in the autofill menu 516 and, in response, the computing device 504 can populate the data associated with the selected entry in the text boxes 508, so that the user can preview the data in the text fields 508. In some implementations, when the user selects the entry, the computing device 504 autofills data associated with the entry in the text fields 508.

In some instances, there may be multiple sets of fields for which multiple autofill entries apply. This is commonly encountered with mailing addresses when the user uses different shipping and billing addresses. In the example of FIG. 5(*b*), a first set of text fields 510 corresponds to a shipping address to which an order is being sent and a second set of text fields 512 corresponds to a billing address for the order. In some embodiments, the user can select entries from the autofill menu 516 to populate the different sets of text fields 510 and 512. For example, the user can select one of the text fields 508 associated with the first set of text fields 510 and then select an autofill entry in the autofill menu 516 to automatically populate the text fields 508 using the data associated with the selected autofill entry. Similarly, the user can select one of the text fields 514 associated with the second set of text fields 512 and then select an autofill entry in the autofill menu 516 to automatically populate the text fields 514 using the data associated with the selected autofill entry. Various other approaches can be utilized to select and populate the text fields. For example, the user can select (e.g., touch or tap) an autofill in the autofill menu 516 and drag the selected entry to a region on the display screen 504 that is associated with a particular text field or set of fields. In some embodiments, the autofill menu 516 includes options for modifying data associated with an autofill entry or for deleting an autofill entry.

Although text fields are used in the example FIGS. 5(*a*)-(*b*), the approaches described herein can be applied to any type of field that may be included in an electronic form including, for example, radio buttons, checkboxes, yes/no boxes, dropdown menus, password fields, hidden fields, and text area fields.

In some embodiments, input provided by a user for a field in any given form may be associated with a type of the field. For example, a user may fill out a form that includes a field for an email address and may provide input for the field. The user can provide the input by entering text (e.g., characters), for example, through a keyboard or virtual keyboard. In some embodiments, the type of the field can be determined by evaluating metadata values associated with the field (e.g., names or information provided for the field in metadata tags) or by recognizing (e.g., optical character recognition) information or a title used to describe the field in the form. As used herein, "type" may refer to a general type of input that can be entered in the field based on the format of the input (e.g., email addresses, phone numbers, text, etc.) or a specific type of input that the field is configured to receive (e.g., name, address, billing address, shipping address, home phone number, work phone number, etc.). In some embodiments, further validation of the user input for the field may be performed to ensure that the input is of an acceptable format based on the type of the field. For example, if the field corresponds to an email address field, then the user input can be evaluated using various techniques (e.g., regular expressions, string matching, etc.) to ensure that the input corresponds to a recognized email format.

By associating the input for the field with a type corresponding to the field, the same input can again be used in a different form that includes a field that is associated with the same type. For example, when the user accesses a different form that includes a field for an email address, then the input previously provided by the user for the field of the same type can be obtained and used to populate the field.

Figure 6A:
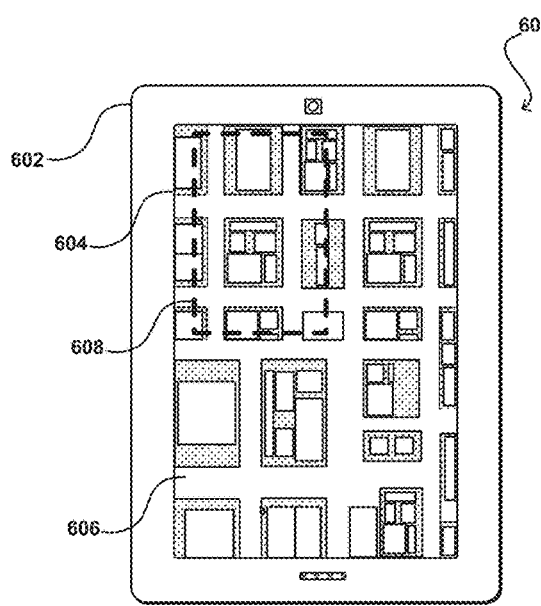
FIGS. 6(a)-(c) illustrate other example approaches for interacting with a computing device based on movement of a user's head in accordance with an embodiment.
Figure 6B:
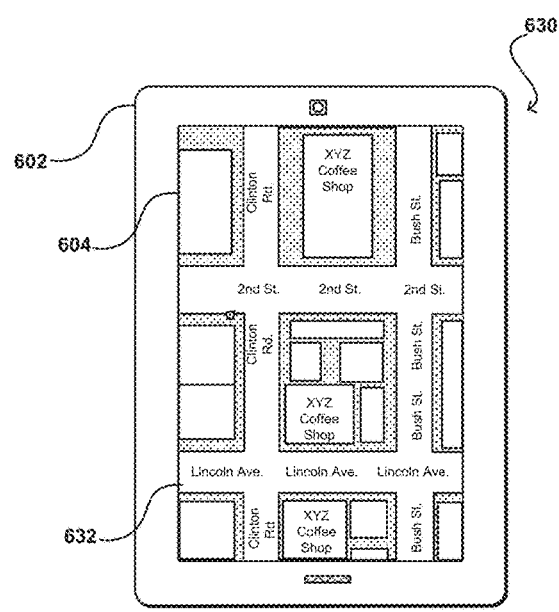
Figure 6C:
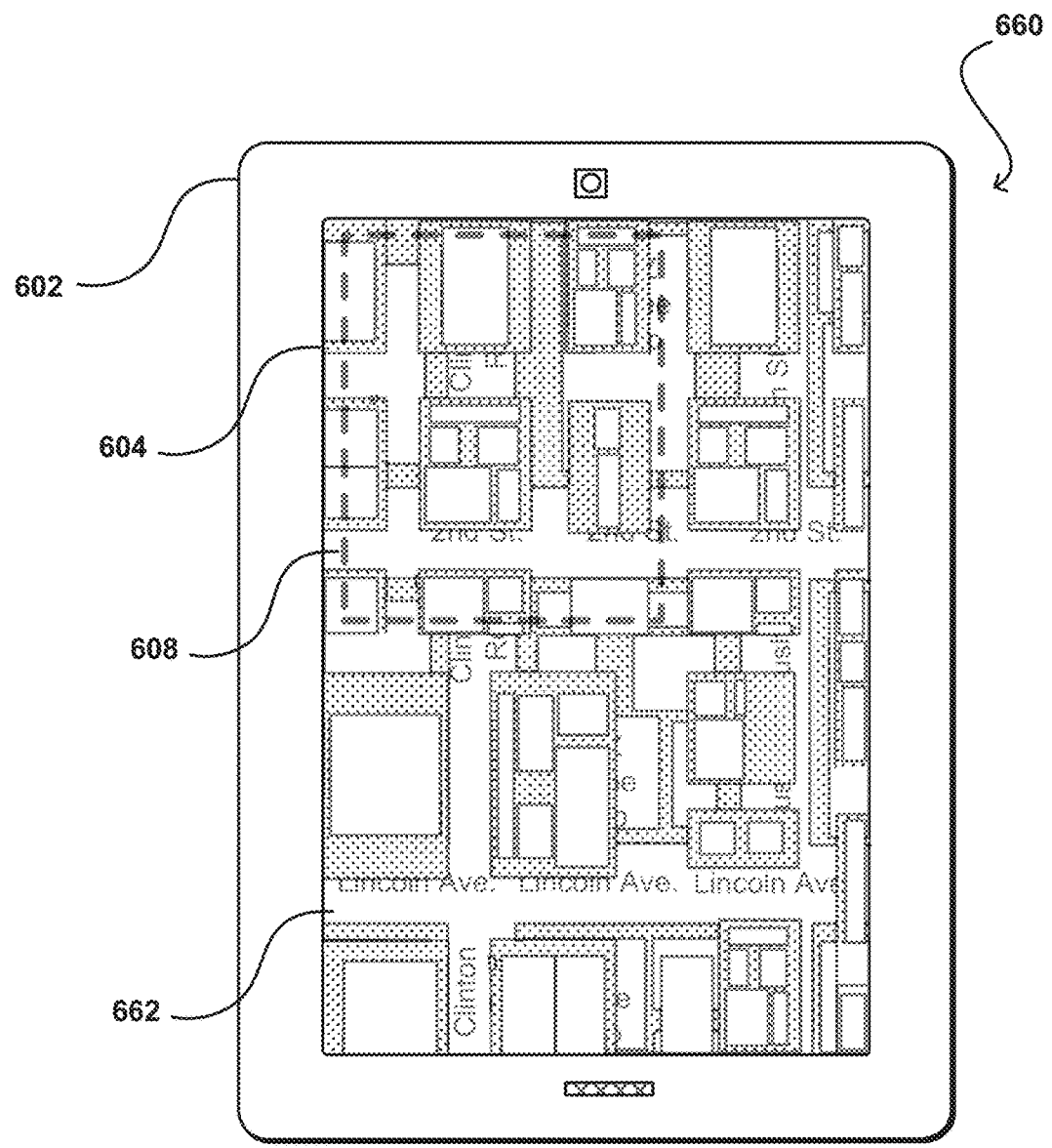

FIGS. 6(a)-(c) illustrate other example approaches for interacting with a computing device 602 based on movement of a user's head in accordance with an embodiment. In some instances, it may be helpful to provide users with related, but different, views of the same content. For example, a user viewing a map of a large geographic region may want access to a view that is zoomed into a portion of the map (i.e., detailed view) while also having the ability to contextualize the detailed view with respect to the map of the large geographic region (i.e., context view). The information shown in the detailed view or the context view can vary depending on the implementation. In one example, a user can view one type of a map (e.g., road map view, satellite map view, physical map view, topographic map view, climate map view, thematic map view, etc.) in the detailed view and a different type of the map in the context view. For example, in the detailed view, the user can view a road map view of a portion of a geographic region while viewing a satellite map view of the portion of the geographic region in the context view.

In some embodiments, the computing device 602 is configured to display different views of content (e.g., a detailed view and a context view) based on an orientation of the computing device 602 to a user (e.g., the user's head) operating the computing device 602. Various approaches to head tracking and/or peek gesture detection in a left direction or a right direction, as described herein, can be utilized to determine when to alternate between the different views of content (e.g., between the detailed view and the context view).

In the example situation 600 of FIG. 6(a), a display screen 604 of the computing device 602 is displaying a context view 606 of a map. The map being displayed can be an interactive map that is provided through a software application executing on the computing device 602. In the example of FIG. 6(a), the context view 606 of the map may be displayed on the computing device 602 based on the user's head being at a threshold angle with respect to the computing device 602. For example, the context view 606 can be displayed when the user has performed a leftward tilt of their head with respect to the computing device 602. In some embodiments, the user can perform a rightward tilt of their head to access the detailed view 632 of the map, as illustrated in the example situation 630 of FIG. 6(b).

In FIG. 6(a), the context view 606 also includes a region selector or container 608 that is encompassing a region within the map being displayed in the context view 606. The region encompassed by the container 608 in the context view 606 can be presented in more detail (e.g., zoomed into the region encompassed by the container 608 at a zoom-level that enlarges the region, a smaller scale view of the region encompassed by the container 608, or displaying the region encompassed by the container 608 using more pixels) in a detailed view 632 of the map, as illustrated in the example of FIG. 6(b). The example situation 630 of FIG. 6(b) illustrates the computing device 602 displaying the detailed view 632 of the map. As mentioned, the detailed view 632 shown in FIG. 6(b) corresponds to the region that is encompassed by the container 608 in the context view 606. As shown in FIG. 6(b), the detailed view 632 of the region encompassed by the container 608 can include more details than the view of the map shown in the context view 606. For example, the detailed view 632 may include higher resolution images, text descriptions (e.g., names of streets, buildings, points of interest), and/or a zoomed in view of the region as compared to the map shown in the context view 606.

In some embodiments, the user operating the computing device can move, rotate, and/or resize the container 608 while in the context view 606 and, in response, the region of the map shown in the detailed view 632 is updated to display a corresponding detailed map of the region that is currently being encompassed by the container 608 in the context view 606. Likewise, the user can interact (e.g., pan and/or rotate) with the map displayed in the detailed view 632 and, in response, the container 608 will move, rotate, and/or be resized so that the region encompassed by the container 608 in the context view 606 corresponds to the updated map displayed in the detailed view 632.

In some embodiments, when a user begins moving the container 608 (e.g., by touching and dragging a region on the display screen 604 that corresponds to the container 608) in the context view 606 and switches over to the detailed view 632 while still touching the display screen 604, any panning of the map in the detailed view 632 is performed at a speed at which the map in the detailed view 632 would pan as if the user were still in the context view 606. In other words, the panning would be performed quickly since smaller movements of the map in the context view 606 correlate to larger movements of the map in the detailed view 632. Similarly, when a user begins panning the map in the detailed view 632 and switches over to the context view 606 while still touching the display screen 604, any panning of the map in the context view 606 is performed at a speed at which the map in the context view 606 would pan as if the user were still in the detailed view 632.

As mentioned, the user can effortlessly switch between the context view 606 and the detailed view 632 by, for example, performing a leftward or a rightward tilt of their head with respect to the computing device 602. In some embodiments, the transparency of the context view 606 with respect to the detailed view 632 is controlled based on an angle of the user (e.g., user's head) with respect to the computing device 602. For example, as the user performs a leftward tilt of their head with respect to the computing device 602, the opacity of the context view 606 is increased and the transparency of the detailed view 632 is increased. As a result, the computing device 602 displays the context view 606 as shown in FIG. 6(a). Similarly, for example, as the user performs a rightward tilt of their head with respect to the computing device 602, the opacity of the detailed view 632 is increased and the transparency of the context view 606 is increased. As a result, the computing device 602 displays the detailed view 632 as shown in FIG. 6(b).

In some embodiments, the detected angle of the user's head can be used for varying an alpha blending between the context view 606 and the detailed view 632. For example, if the user performs a leftmost tilt of their head with respect to the computing device 602 (or the surface of the computing device 602 is tilted to the right), then an alpha blend of 100% can be used for the context view 606. Similarly, if the user performs a rightmost tilt of their head with respect to the computing device 602 (or the surface of the computing device 602 is tilted to the left), then an alpha blend of 100% can be used for the detailed view 632. In some embodiments, both the context view 606 and the detailed view 632 are displayed in a combined view 662 when an angle of the user's head is centered with respect to the computing device 602, as illustrated in FIG. 6(c). For example, if the user's head is centered with respect to the computing device 602, then an alpha blend of 50% can be used for the context view 606 and an alpha blend 50% can be used for the detailed view 632.

Although FIGS. 6(*a*)-(*c*) describe the context view and the detailed view with respect to a map, the approaches described herein can be applied to any type of content in which such views can be utilized including, for example, documents, blueprints, and images.

Figure 7:
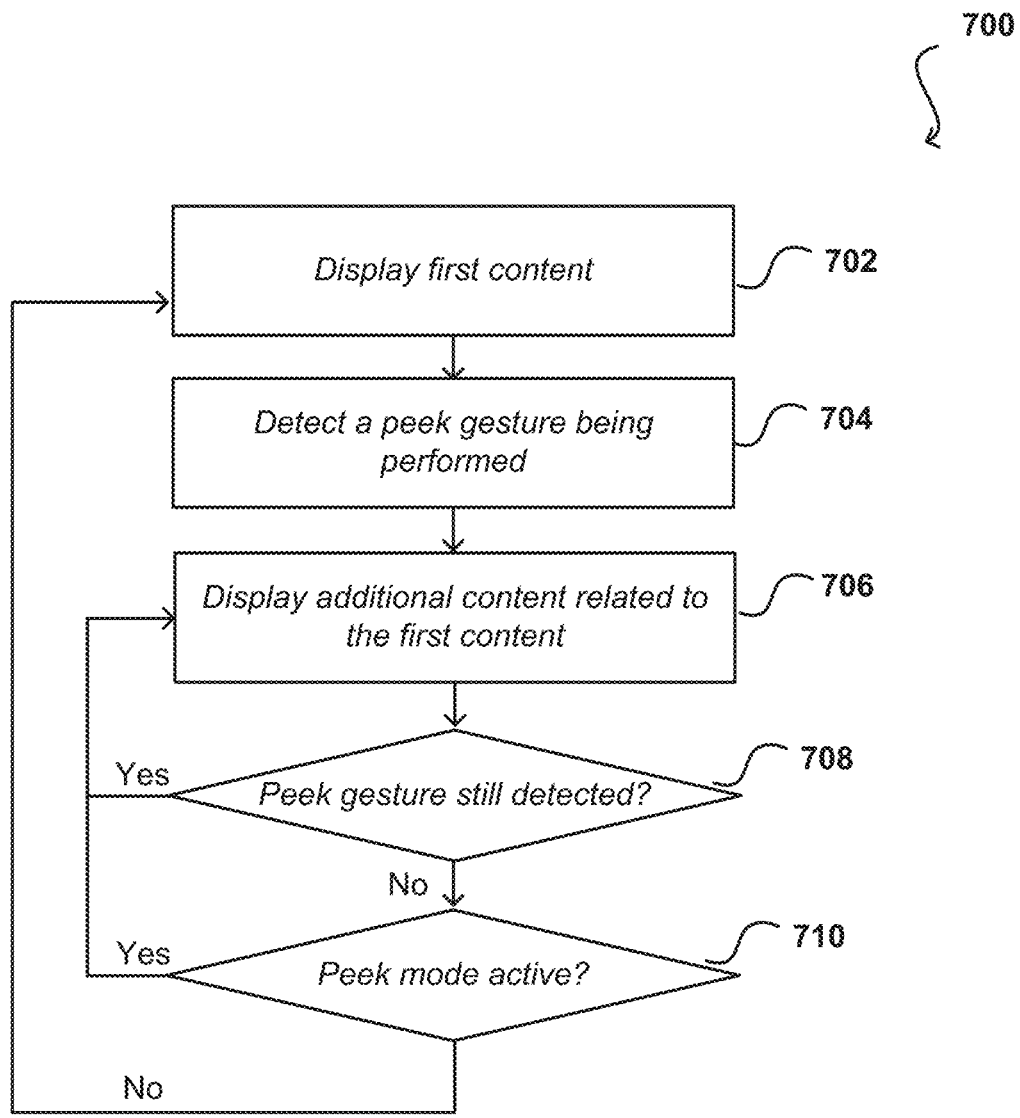
FIG. 7 illustrates an example process for controlling a computing device in accordance with various embodiments.

FIG. 7 illustrates an example process 700 for controlling a computing device based on an angle of a user's head with respect to the computing device in accordance with an embodiment. It should be understood that, for any process discussed herein, there can be additional, fewer, or alternative steps performed in similar or alternative orders, or in parallel, within the scope of the various embodiments unless otherwise stated.

In this example, the computing device displays first content 702 on its display screen. As described above, the first content can be an object (e.g., a media object), text (e.g., a long string of text), a text preview (e.g., email preview), to name some examples. The computing device can determine that a peek gesture 704 is being performed. For example, the computing device can determine that the peek gesture is being performed using the various approaches described throughout this specification.

The computing device can display additional content 706 on the display screen in response to detecting the peek gesture. The additional content can be related to the first content and may include an overlay of one or more options that are actionable with respect to the first content or display additional text relating to the first content. Depending on the embodiment, the displayed additional text may be animated (e.g., scrolled) as a marquee or the additional text may simply be displayed in addition to the first content, for example, as an expanded preview of the first content.

The additional content can continue to be displayed provided that the peek gesture 708 is still detected. If, however, the peek gesture is no longer detected, the computing device can determine whether the device is locked 710 in peek mode. For example, while in peek, the user operating the computing device can touch the display screen. In response, the computing device can stay in peek mode and, consequently, display the additional content that would be displayed in peek mode, until the user stops touching the display screen even though a peek gesture is no longer detected. If, however, the peek mode is not active, the computing device can update the display to again display 702 the first content without displaying the additional content.

Figure 8:
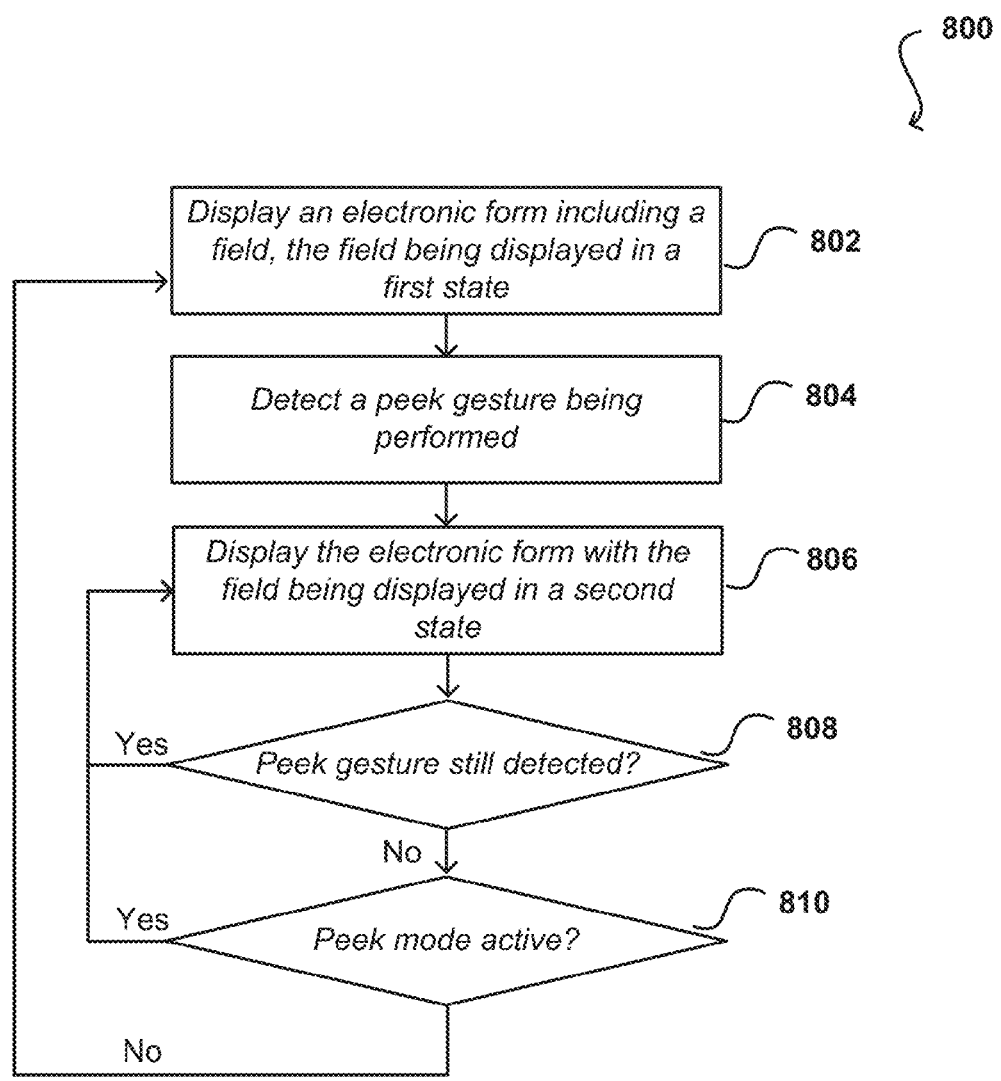
FIG. 8 illustrates another example process for controlling a computing device in accordance with various embodiments.

FIG. 8 illustrates an example process 800 for controlling a computing device based on an angle of a user's head with respect to the computing device in accordance with an embodiment. It should be understood that, for any process discussed herein, there can be additional, fewer, or alternative steps performed in similar or alternative orders, or in parallel, within the scope of the various embodiments unless otherwise stated.

In this example, the computing device displays an electronic form 802 on its display screen. As described above, the electronic form can include a fillable field that is displayed on the device in a first state. For example, the field can be displayed as empty without being populated, for example, with any text, checkboxes, selections, etc. The computing device can determine that a peek gesture 804 is being performed. For example, the computing device can determine that the peek gesture is being performed using the various approaches described throughout this specification.

Once the peek gesture is detected, the computing device can display the electronic form 806 on the display screen with the field being displayed in a second state. For example, the field in the second state may be populated using data obtained from an autofill entry or using input that was previously provided by the user for the field. The field can continue to be displayed in the second state provided that the peek gesture 808 is still detected. If, however, the peek gesture is no longer detected, the computing device can determine whether the device is locked 810 in peek mode. For example, while in peek, the user operating the computing device can touch the display screen. In response, the computing device can stay in peek mode and, consequently, display the additional content that would be displayed in peek mode, until the user stops touching the display screen even though a peek gesture is no longer detected. If, however, the peek mode is not active, the computing device can update the display to again display 802 the electronic form with the field displayed on the device in the first state (e.g., the field can again be displayed as empty without being populated).

Figure 9:
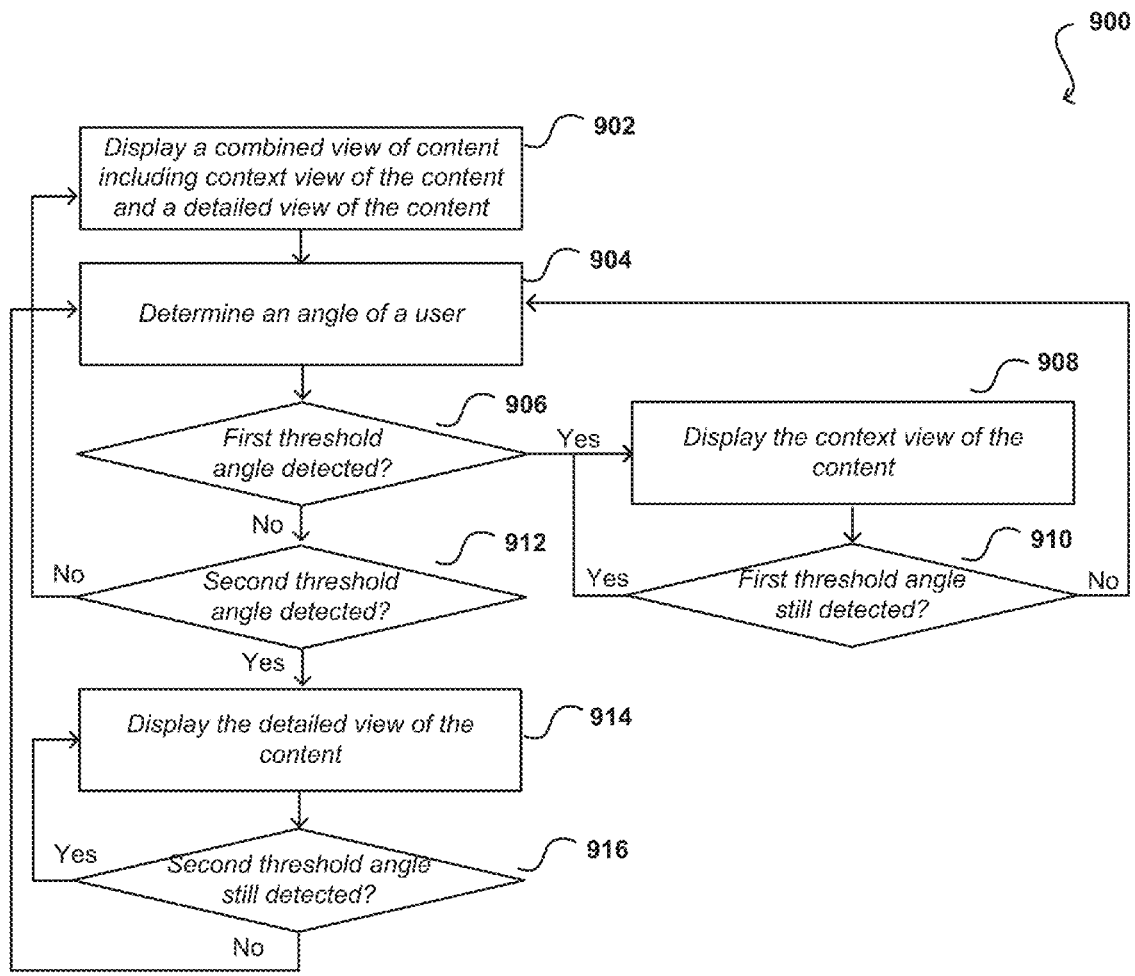
FIG. 9 illustrates another example process for controlling a computing device in accordance with various embodiments

FIG. 9 illustrates an example process 900 for controlling a computing device based on an angle of a user's head with respect to the computing device in accordance with an embodiment. It should be understood that, for any process discussed herein, there can be additional, fewer, or alternative steps performed in similar or alternative orders, or in parallel, within the scope of the various embodiments unless otherwise stated.

In this example, the computing device displays a combined view of content 902 including a context view and a detailed view. For example, the combined view can be displayed when an angle of the user's head is centered with respect to the computing device. The computing device can determine an angle of the user 904 with respect to the computing device. If the angle of the user satisfies a first threshold, then the computing device can display the context view 908 of the content. For example, the context view can be displayed when the user has performed a leftward tilt of their head with respect to the computing device. The computing device can continue to display the context view of the content 908 as long as the first threshold is satisfied 910.

If, however, the first threshold is not satisfied, the computing device can determine whether the angle of the user satisfies a second threshold 912. If the angle satisfies the second threshold, the computing device can display a detailed view 914 of the content. For example, in some embodiments, the user can perform a rightward tilt of their head to access the detailed view of the content. The computing device can continue to display the detailed view of the content 914 as long as the second threshold is satisfied 916.

As mentioned, the user can effortlessly switch between the context view and the detailed view by, for example, performing a leftward or a rightward tilt of their head with respect to the computing device. In some embodiments, the transparency of the context view with respect to the detailed view is controlled based on an angle of the user (e.g., user's head) with respect to the computing device. For example, as the user performs a leftward tilt of their head with respect to the computing device, the opacity of the context view is increased and the transparency of the detailed view is increased. Similarly, for example, as the user performs a rightward tilt of their head with respect to the computing device, the opacity of the detailed view is increased and the transparency of the context view is increased.

In some embodiments, the detected angle of the user's head can be used for varying an alpha blending between the context view and the detailed view. For example, if the user performs a leftmost tilt of their head with respect to the computing device (or the surface of the computing device is tilted to the right), then an alpha blend of 100% can be used for the context view. Similarly, if the user performs a rightmost tilt of their head with respect to the computing device (or the surface of the computing device is tilted to the left), then an alpha blend of 100% can be used for the detailed view.

FIGS. 10(a)-(d) illustrate examples of a 1002 user operating a computing device 1004 in which the device is positioned "off-axis" or not orthogonal and/or not centered with respect to the user in accordance with various embodiments. Although a portable computing device (e.g., a smart phone, tablet, or portable media player) is shown held in the user's hands, it should be understood that other types of computing devices can utilize aspects of the various embodiments as should be apparent in light of the teachings and suggestions contained herein. The computing device can include at least one camera 1006 located on the front of the device and the on same surface as the display element to capture image data of subject matter facing the front of the device, such as the user 1002 viewing the display element. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated.

In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 1006 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

In the example situation 1000 of FIG. 10(a), the computing device 1004 can be seen positioned such that its front face is at an angle or off-axis with respect to the user 1002. For example, the user 1002 may primarily be operating another computing device, such as a desktop or laptop computer, while the computing device 1004 is positioned to the right and tilted with respect to the user. As another example, the computing device may be mounted within the user's vehicle and may be operated upon while the vehicle is in park. In FIG. 10(b), an image 1010 of the user's head facing rightward, is captured by a front-facing camera (not shown) of the computing device 1004. A system that only analyzed the angle of the user's head from image 1010 may mistakenly interpret that the user has performed a leftward tilt of his head and/or that the user has tilted the device leftward (i.e., rotated the device towards his left along the y-axis). Alternatively, or in addition, when the user performs an intended gesture based on a change in angle of the user's head, a conventional system may not recognize such a gesture.

In the example situation 1020 of FIG. 10(c), user 1002 can be seen operating computing device 1004 as the device lies flat on a table. FIG. 10(d) illustrates an image 1030 captured by front-facing camera 1006 of the device from this vantage point. Image 1030 includes a top portion of the head of the user 1002, including the user's eyes, nose, and mouth, while cutting off a bottom portion of the user's head. Further, the user's head is at an angle or off-axis with respect to the device. A system that limited analysis to image 1030 may incorrectly determine that the user has tilted his head downward or tilted the device forward. Alternatively, or in addition, such a conventional system may fail to recognize when the user performs an intended gesture while the device is operated in this manner. A robust head gesture detection system must account for instances, such as those illustrated in FIGS. 10(a)-(d), when the resting position of the user's head and/or the resting position of the device is off-axis or not substantially orthogonal and/or not centered with respect to each other.

Systems and approaches in accordance with various embodiments enable a relative position of the user, such as the angle of the user's head or the actual and/or apparent movement of the user's head with respect to a computing device, to be recognized as input for the computing device even when the user is positioned "off-axis" or not orthogonal and/or not centered with respect to the computing device. In various embodiments, an elastic "reference point" or "reference angle" can be used for adjusting the determination of how far the user's head has moved with respect to a computing device for controlling the device. As used herein, the "reference point" or "reference angle" is an estimate of the angle of the user's head in his natural resting position.

The reference point or reference angle can be determined based on an elastic function of relative position information and previous values of the reference point over time. In some embodiments, the elastic function includes weighting a difference or delta between the detected head angle and the previous value of the reference point by an elastic factor such that the reference point and the head angle converge within a specified period of time. For example, the larger the difference between a previous reference point and the detected angle of the user's head, the faster the currently determined reference point converges with the detected angle. In conjunction with the elastic reference point, a "neutral region" can be defined based on the reference point. As used herein, the "neutral region" is a fixed area around the reference point or a specified range from the reference point in which the reference point is allowed to move. That is, the reference point is bound within the limits of the neutral region, and the reference point is continuously updated when the detected angle of the user's head is within the neutral region. This dynamic adjustment of the reference point or reference angle allows the user to operate a computing device off-axis and enables the device to continue detecting changes in angle of the user's head with respect to the device for controlling the device. Such an approach can account for differences between when the user is changing his natural resting position and/or the resting position of the device and when the user is intending to control the device based on the angle of the user's head relative to the device.

Figure 11A:
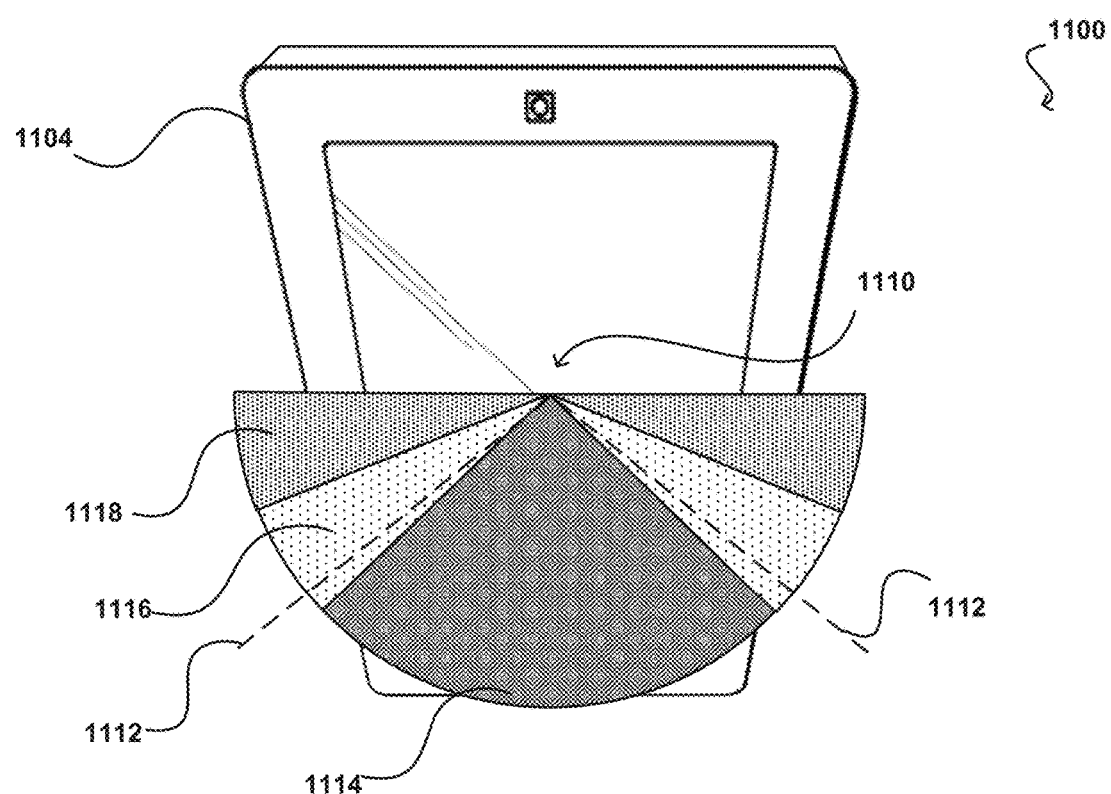
FIGS. 11(a)-(b) illustrate example approaches for controlling a computing device based on movement of a user's head in accordance with an embodiment.
Figure 11B:
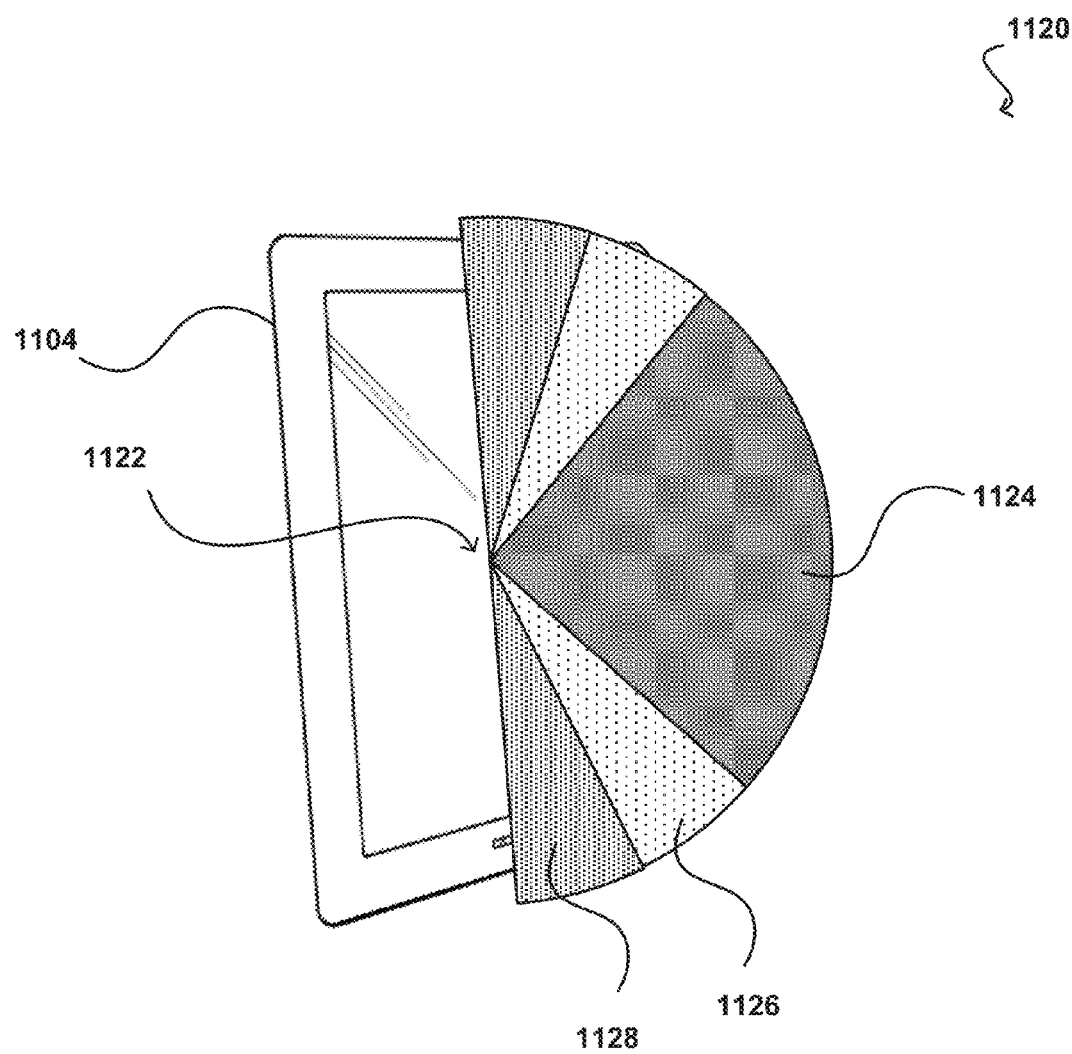

FIG. 11(a)-(b) illustrate an example approach for controlling a computing device based on movement of a user's head with respect to the computing device in accordance with an embodiment. In this example, a reference point 1110 is determined for the relative position of a user with respect to a computing device and various zones or regions are derived from the reference point. In FIG. 11(a), reference point 1110 is represented as a center point of a front surface of computing device 1104. The inner angular region or neutral region, the area between dashed lines 1112, is defined as constant angle values with respect to the reference point 1110. In an embodiment, the inner angular region or neutral region is configured to be between 0 degrees and ±10 degrees with respect to the reference point. As discussed, the reference point 1110 is bound inside the neutral region, and the reference point is only updated when the detected angle of the user's head is determined to be within the neutral region. The most current reference point is estimated according to an elastic function of the detected angle of the head of the user (or other relative position information) and the reference point over time. In an embodiment, the elastic function is based on weighting a delta or difference between the detected head angle and the current value of the reference point by an elastic factor such that the detected head angle and the reference point converge within a specified period of time. In some embodiments, the currently determined reference point will converge with the detected angle of the user's head after approximately 4 seconds. In operation, as the user's head moves, the reference point follows the angle of the user's head elastically. The larger the difference between a previously determined reference point and the detected angle of the user's head, the faster the current reference point converges towards the detected angle of the user's head.

FIG. 11(a) also illustrates various regions or zones corresponding to states for a particular gesture, a "peek" gesture or a lateral movement of the user's head, which can be used to control a computing device. In this example, the peek gesture operates according to three states—Peek Off, corresponding to the inner angular range or region 1114 in FIG. 11(a); Continuous Peek, corresponding to the intermediate angular range or region 1116; and Peek On, corresponding to the outer angular range or region 1118. Peek Off and Peek On are also defined as constant angle values with respect to the reference point 1110. In an embodiment, Peek Off is configured to be between 0 degrees and ±9 degrees with respect to the reference point, Continuous Peek is configured to between ±9 degrees and 13.5 degrees, and Peek On is configured to be greater than ±13.5 degrees with respect to the reference point.

As discussed, the dynamic adjustment of the reference point allows a user to operate a computing device as the device is positioned off-axis and/or not centered with respect to the user yet still obtain expected behavior for controlling the device based on movement of the user's head. In this example, the user must move the device left or right from center at least 13.5 degrees to trigger the Peek On state. However, due in part at least to the elastic reference point, the slower the device is moved, the further the device must be moved beyond 13.5 degrees because the reference point will otherwise begin updating to converge with the detected angle of the user's head. For instance, in a particular embodiment, a 500 millisecond movement of the device may require a movement of greater than 16 degrees to achieve the Peek On state while a 1.0 second movement may require a movement of greater than 20 degrees. In an embodiment, when the user is in the Peek On state, a peek gesture in the opposite direction can be reached by moving the device about 27.0 degrees in the opposite direction in less than 500 milliseconds. Slower movements may require movements of a larger degree as the reference angle may begin updating during the period of the slower movement.

Although FIG. 11(a) illustrates an example of detecting movement of the user's head by using a single reference point with respect to a single x-axis or lateral axis of computing device 1104, it will be appreciated that multiple reference points and/or multiple axes can be used for enabling a user to control a device via movement of the user's head in two or three dimensions. In some embodiments, a single reference point can be used with multiple axes and multiple angular ranges or regions corresponding to various states for controlling a device based on head movement. In other embodiments, multiple reference points can be used.

FIG. 11(b) illustrates an example 1120 of the operation of reference point 1122 with respect to a y-axis or vertical axis of computing device 1104 in accordance with an embodiment. The example approaches of FIGS. 11(a)-(b) can each be used alone to enable control of a computing device based on movement of the user's head in one dimension (e.g., lateral movement or vertical movement) or in combination to enable control of the device based on head movement in two dimensions. In an embodiment, a third axis can be used to enable control of the device based on head movement in three dimensions. Although multiple reference points 1110 and 1122 are utilized in the examples of FIGS. 11(a) and 11(b), respectively, it will be appreciated that a single reference point can be used in other embodiments. FIG. 11(b) also illustrates an inner angular range or region 1124, an intermediate angular range or region 1126, and an outer angular range or region 1128. In an embodiment, inner angular range 1124, intermediate angular range 1126, and outer angular range 1128 correspond to the states of a "scroll" gesture or a vertical movement of the user's head with respect to the computing device for controlling the device, i.e., Scroll Off, Continuous Scroll, and Scroll On, respectively. The inner angular range or region 1124 corresponding to the Scroll Off state, the intermediate angular range or region 1126 corresponding to the Continuous Scroll state, and the outer angular range or region 1128 corresponding to the Scroll On state, are defined as constant angle values with respect to the reference point 1122. In an embodiment, the inner angular range 1124 is configured to be ±7.5 degrees with respect to the reference point, the intermediate angular range 1126 is configured to be between ±8 degrees and ±10 degrees, and the outer angular range 1128 is configured to be greater than ±10 degrees. In the example of FIG. 11(b), the constant angular values for the inner angular range 1124, intermediate angular range 1126, and outer angular range 1128 differ from those of the example of FIG. 11(a). Such an approach can be advantageous as it can account for the limited vertical range of movement of the user's head relative to the lateral range of movement of the user's head. In other embodiments, the constant angle values for the various states of a head gesture can be the same across multiple axes.

Similar in operation to the approach of example 1100 in FIG. 11(a), the reference point 1122 is bound inside the inner angular range or region 1124, and the reference point is only updated when the detected angle of the user's head is determined to be within the inner angular range or region 1124. The current reference point is estimated according to an elastic function the detected angle of the head of the user (or other relative position information), and previous values of the reference point over time. In an embodiment, Scroll On can enable a user to scroll through content, such as a webpage or other web-based content, a PDF, a document, a book, a collection of content (e.g., applications, music, videos, photos, etc.), a text-based list of the content, or other content, and Scroll Off can enable the user to stop scrolling of content. In an embodiment, Continuous Scroll can control the speed at which the content is scrolled with the scroll speed based on a ratio or percentage of the head angle between the Scroll On and Scroll Off states.

Figure 12:
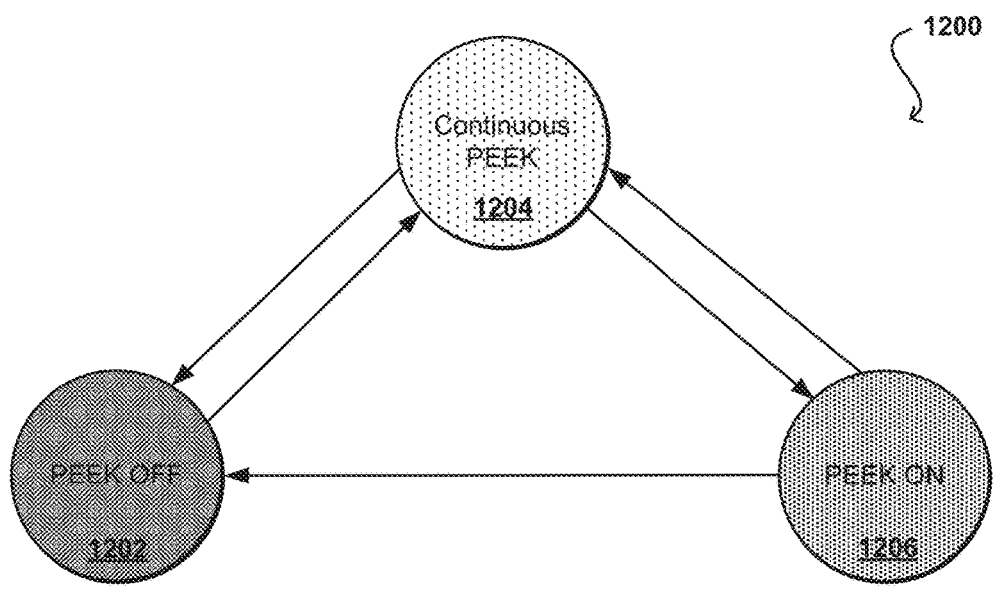
FIG. 12 illustrates an example state transition diagram for controlling a computing device based on movement of a user's head in accordance with an embodiment.

FIG. 12 illustrates an example state transition diagram 1200 for operation of a peek gesture in accordance with an embodiment. In this example, the user can be determined to be in one of the aforementioned peek states—Peek Off 1202, Continuous Peek 1204, or Peek On 1206. In the Peek Off state 1202, the angle of the user's head with respect to the computing device is determined to be within the neutral region. In an embodiment, the reference point updates continuously when the user is determined to be in the Peek Off state 1202 for at least 500 milliseconds. Upon a determination that the difference between the angle of the user's head with respect to the computing device and the reference point exceeds a Peek Off threshold, the user will be determined to be in the Continuous Peek state 1204.

In the Continuous Peek state 1204, the reference point becomes fixed and is not updated. While the user is in the Continuous Peek state 1204 and the difference between the detected angle of the user's head with respect to the computing device and the fixed reference point exceeds a Peek On threshold, the user will be determined to be in the Peek On state 1206. In an embodiment, the transition from the Continuous Peek state 1204 to the Peek On state 1206 will be recognized as a user gesture and an action corresponding to the gesture can be performed, such as displaying additional information, contextual information, or other information associated with initial content. On the other hand, if the user is in the Continuous Peek state 1204 and the difference between the detected angle and the fixed reference point decreases below the Peek Off threshold, the user will be determined to be in the Peek Off state 1202. In an embodiment, the transition from the Continuous Peek state 1204 to the Peek Off state 1202 will be recognized as a gesture and an action corresponding to the gesture can be performed, such as reverting to display of the initial content.

In an embodiment, the detected angle of the user's head in the Continuous Peek state can be used for rendering of content, such as alpha blending between a first view of content and a second view of the content with additional contextual or associated information, or an animation of one or more graphical elements. For example, the magnitude of the detected angle of the user's head can be expressed as a ratio or percentage between the Peek Off and Peek On states, and that ratio or percentage can be used to control how much of the first view of the content is to be displayed and how much of the second view of the content is to be displayed. As another example, the ratio or percentage can be used for scaling one or more graphical elements. As still another example, the ratio or percentage can be used to control animation of one or more graphical elements.

In the Peek On state 1206, if the difference between the detected angle of the user's head with respect to the computing device and the reference point decreases below the Peek On threshold, the user will be determined to be in the Continuous Peek state 1204. In an embodiment, if the user's head cannot be detected for more than 5 seconds, the user will be determined to be in the Peek Off state 1202.

Figure 13A:
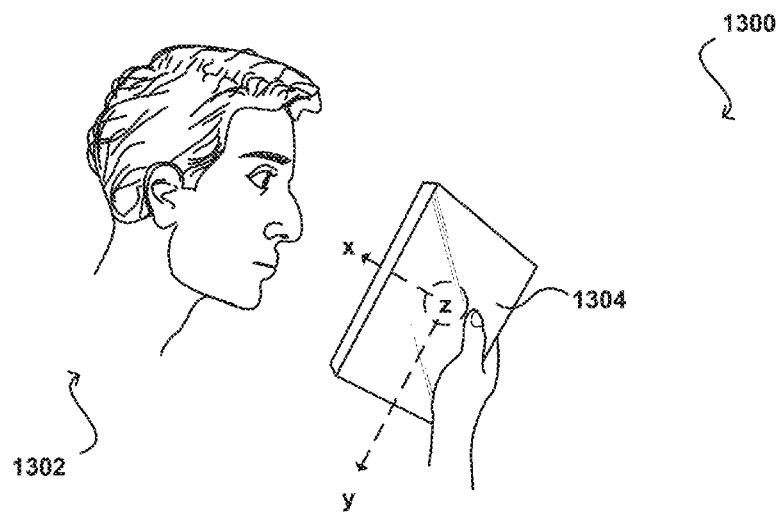
FIGS. 13(a)-(f) illustrate an example approach for controlling a computing device based on movement of a user's head with respect to a computing device in accordance with an embodiment.
Figures 13B, 13C:
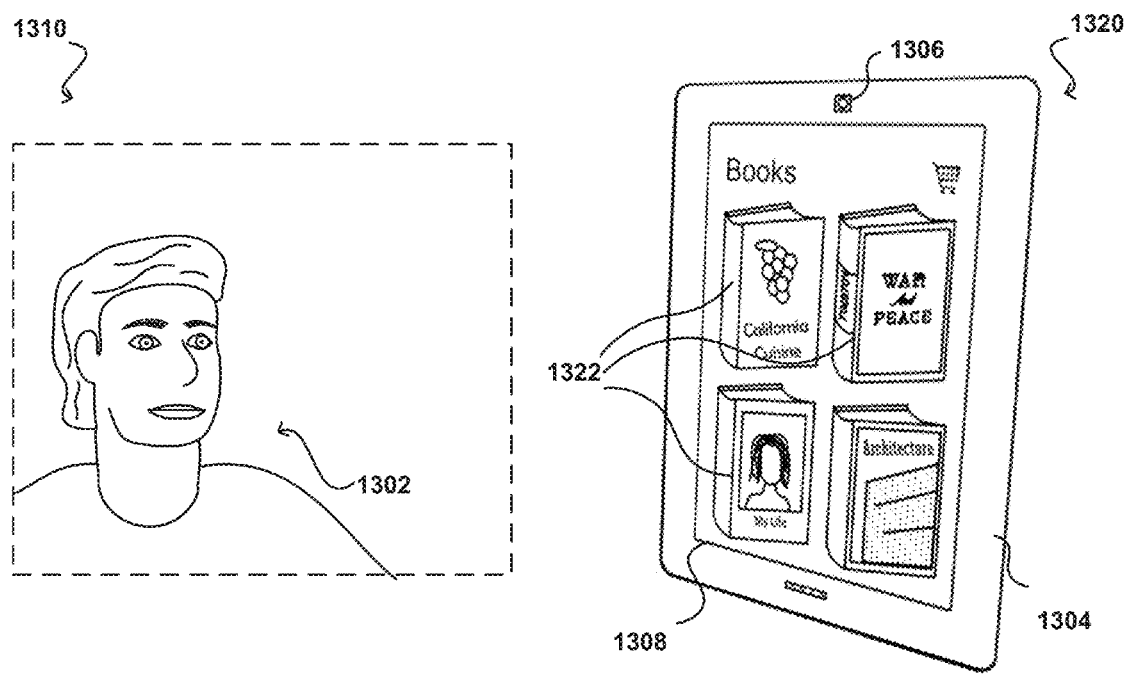
Figure 13D:
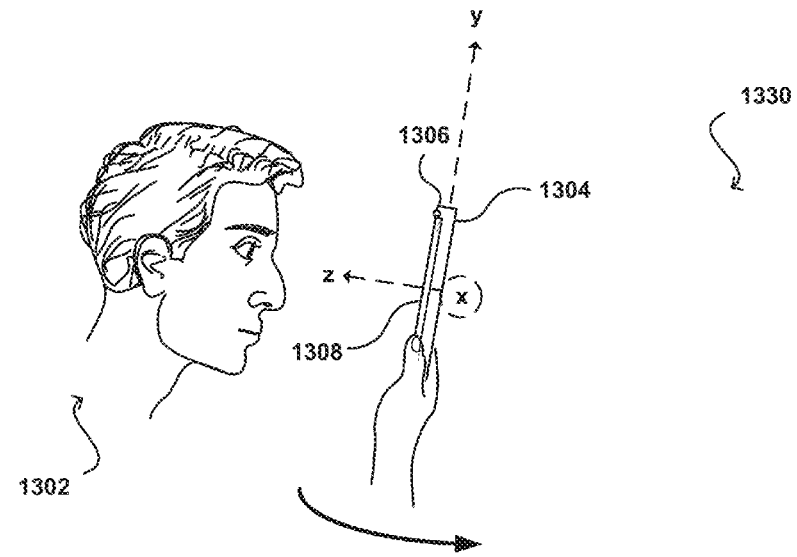

FIGS. 13(a)-(f) illustrate an example approach for controlling a computing device based on the angle of a user's head with respect to the computing device in accordance with an embodiment. In the example situation 1300 of FIG. 13(a), a user 1302 can be seen viewing a display element 1308 of a computing device 1304 as the device is positioned off-axis or tilted to the left with respect to the user in the user's natural resting position. As illustrated in FIG. 13(b), when the user 1302 positions the computing device in this manner, the image data captured by the front-facing camera of the device can include the image 1310, a three-quarters profile of the head or face of the user facing leftward. Although one image is shown to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position of the user relative to the device and/or the viewing angle of the user with respect to the device.

Figure 13E:
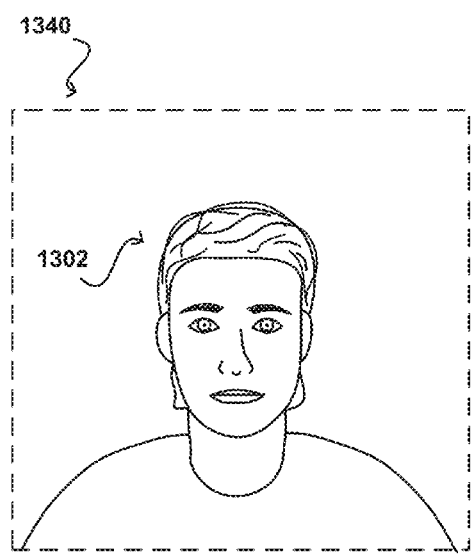

FIG. 13(c) illustrates an example 1320 of the contents of a bookstore application presented on the display element 1308 from the perspective of the user 1302, including images representative of books 1322 that can be purchased from an online bookstore associated with the bookstore application. In this example, the books 1322 include contextual information or metadata that is not immediately presented on the display element. However, the bookstore application supports certain gestures, such as a peek gesture or a "scroll" gesture (i.e., an up and/or down movement of the user's head with respect to the device). These gestures, when performed by the user and detected by the computing device, can cause the contextual information to be displayed. Thus, in the example situation 1330 of FIG. 13(d), the user 1302 can be seen performing a peek gesture by rotating the computing device 1304 to the right with respect to the user, i.e., the user has tilted the device to his right along the longitudinal or y-axis. As shown in FIG. 13(e), the tilt or rotation of the device causes the camera to capture a different view or perspective of the user within image 1340, here, a full frontal view of the user. In this example, the apparent motion of the angle of the user's head (which may be primarily due to the motion of the device) can be tracked from the initial angle detected in FIG. 13(b) to the new angle in FIG. 13(e).

Various approaches can be used to track relative position information of the user, such as the angle of the user's head, over time, including image analysis based on images captured by one or more cameras of a computing device. In addition, or alternatively, a computing device can include one or more motion and/or orientation determination components, such as an accelerometer, gyroscope, magnetometer, or a combination thereof, that can be used to determine the position and/or orientation of the device. In some embodiments, the device can be configured to monitor for a change in position and/or orientation of the device using the motion and/or orientation determination components. In other embodiments, input data captured by the motion and/or orientation determination components can be analyzed in combination with images captured by one or more cameras of the device to determine angle of the user's head with respect to the device. Such an approach may be more efficient and/or accurate than using methods based on either image analysis or motion/orientation sensors alone. These various approaches—image-based head tracking of the user, motion/orientation sensor-based monitoring of the device, or a combined approach—are discussed in co-pending U.S. patent application Ser. No. 13/965,126, entitled, "Robust User Detection and Tracking," filed Aug. 12, 2013, which is incorporated herein by reference.

Figure 13F:
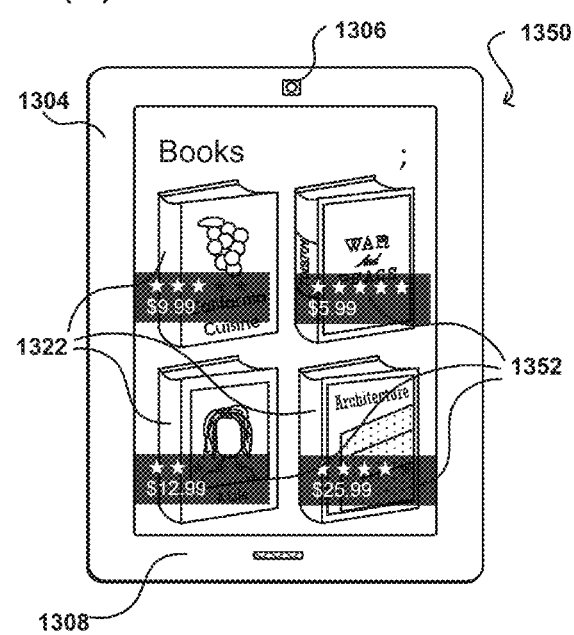

As illustrated in FIG. 13(f), contextual information 1352 for the books 1322, such as user reviews and prices, is presented based on recognition of the peek gesture performed by the user. In this manner, the most pertinent information can be presented for a user in a default view for an application but the user may obtain additional information, contextual information, and other associated information via a peek gesture. Such an approach can be advantageous for portable computing devices whose display elements may be of limited dimensions. Further, user interfaces can be designed so as not to overload the users with too much information, which can be difficult for users to absorb in addition to increasing processing and power usage by user devices.

Figure 14A:
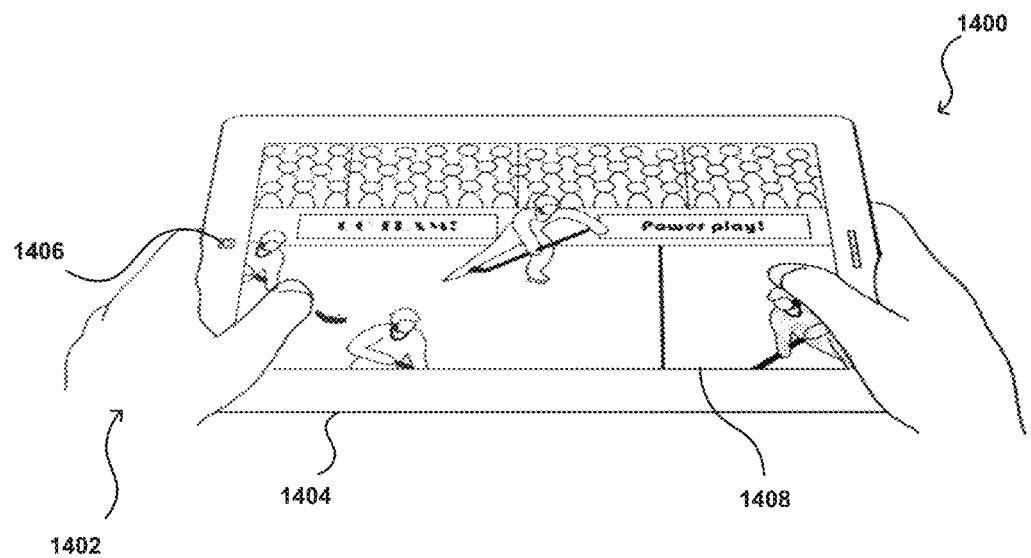
FIGS. 14(a)-(b) illustrate an example approach for controlling a computing device based on movement of a user's head with respect to a computing device in accordance with an embodiment.
Figure 14B:
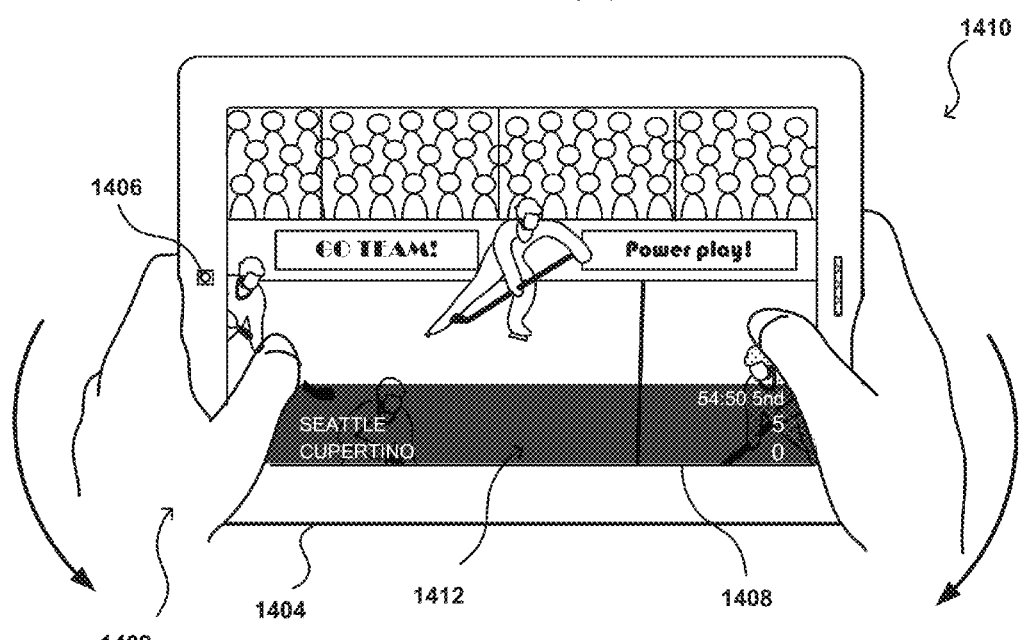

FIGS. 14(a)-(b) illustrate an example approach for controlling a computing device based on the angle of a user's head with respect to the computing device in accordance with an embodiment. In FIG. 14(a), a user 1402 can be seen operating a computing device 1404 to view a hockey game that is presented via a display element 1408 of the device. The device 1404 is positioned off-axis or tilted forward with respect to the user. As the display element 1408 is of limited dimensions, contextual information associated with the hockey game is not immediately presented so as to provide the user with a fuller view of the hockey game. In this example, the viewer application that is streaming the hockey game supports gestures based on the angle of the user's head, such as a scroll gesture or an up and/or down movement of the user's head with respect to the device and/or a rotation of the device along the lateral or x-axis of the device, for displaying the contextual information associated with the hockey game. As illustrated in the example situation 1410 of FIG. 14(b), the user performs a scroll gesture by tilting top of the device towards himself to cause contextual information 1412, the score of the hockey game and the time remaining in the game, to be displayed on display element 1408. Although FIGS. 13(a)-13(f) illustrate an example of the actual or apparent lateral movement of the angle of the user's head with respect to a device and FIGS. 14(a)-14(b) illustrate an example of the actual or apparent up and/or down movement of the angle of the user's head with respect to a device, it will be appreciated that various other movements can be recognized in various embodiments, including, as discussed, movements in intercardinal or secondary-intercardinal directions, among others.

Figure 15:
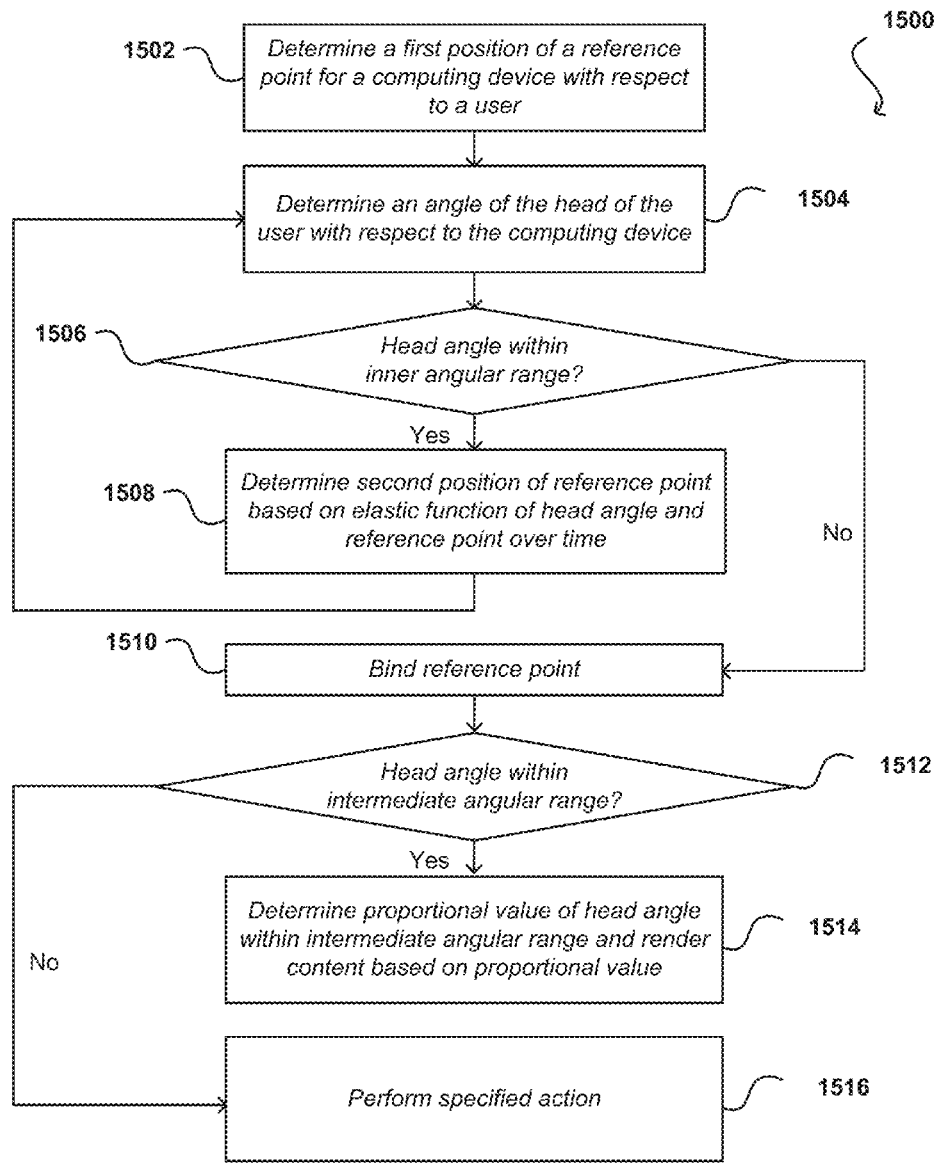
FIG. 15 illustrates an example process for controlling a computing device based on movement of a user's head with respect to the computing device in accordance with an embodiment.

FIG. 15 illustrates an example process 1500 for controlling a computing device based on an angle of a user's head with respect to the computing device in accordance with an embodiment. It should be understood that, for any process discussed herein, there can be additional, fewer, or alternative steps performed in similar or alternative orders, or in parallel, within the scope of the various embodiments unless otherwise stated.

The process may be initiated by powering on a computing device such as if the process is performed as part of a home screen application. In other embodiments, a user interface for an application may be based on movement of the user's head with respect to the computing device, such as the example applications illustrated in FIGS. 13(a)-D or 14(a)-B, and the process can be initiated by starting up the application. The process may begin by determining a first position of a reference point or reference angle of a computing device with respect to a user 1502. The initial value of the reference point or reference angle can begin at zero or centered and orthogonal with respect to the user.

The process may continue by determining relative position information of the user with respect to the device, such as by detecting the angle of the user's head with respect to the computing device 1504. In at least some embodiments, the relative position of the user or the angle of the user's head can be determined by analyzing one or more images captured by a camera of the device. For example, a point corresponding to the user's head, such as a point between the user's eyes, can be located within image data captured by the camera. This point forms a ray with another point corresponding to the computing device, such as a center point of a front surface of a display screen of the computing device. The head angle can be calculated based on the ray corresponding to the point of the user's head and the point of the computing device. In some embodiments, more robust position information can be estimated by analyzing multiple images from multiple cameras captured at the same time or substantially at the same time in a process referred to as reconstruction. When there are two images or a stereo pair of images, the reconstruction process may include finding a plurality of corresponding points between two images, determining the fundamental matrix from the corresponding points, determining the camera matrices from the fundamental matrix, triangulation of the 3D points that project to the corresponding 2D points in the two images, and rectifying the projective reconstruction to metric. Variations on this approach are possible, such as where the cameras are calibrated.

Approaches for camera calibration include the direct linear transformation (DLT) method, or the algorithm set forth in Tsai, Roger. "A versatile camera calibration technique for high-accuracy 3D machine vision metrology using off-the-shelf TV cameras and lenses." Robotics and Automation, IEEE Journal of 3, no. 4 (1987): 323-344, or the algorithm set forth in Zhang, Zhengyou. "A flexible new technique for camera calibration." Pattern Analysis and Machine Intelligence, IEEE Transactions on 22, no. 11 (2000): 1330-1334, each of which is incorporated herein by reference. In the case where the cameras are calibrated, the essential matrix can be computed instead of the fundamental matrix, and determining the camera matrices may be unnecessary.

Finding corresponding points between two images generally involves feature matching. The fundamental matrix is a mapping from the two-dimensional projective plane of the first image to the pencil of epipolar lines corresponding to the second image. Approaches for determining the fundamental matrix include the seven-point correspondences algorithm, the normalized eight-point algorithm, the algebraic minimization algorithm, minimization of epipolar distance, minimization of symmetric epipolar distance, the maximum likelihood (Gold Standard) method, random sample consensus (RANSAC), least median of squares, among others. In some embodiments, the essential matrix may be calculated if the camera calibration matrices are known.

Triangulation computes the 3D point that project to each point correspondence between the two images. Approaches for triangulation include linear methods, the optimal triangulation method, among others. Rectifying the projective reconstruction to metric can be implemented directly, such as by computing the homography for five or more ground control points with known Euclidean positions. Another approach for rectifying the projective reconstruction is referred to as the stratified method, which may involve an affine reconstruction and a metric reconstruction. One of ordinary skill in the art will appreciate that other embodiments may reconstruct 3D points from multiple 2D images, such as approaches based on calculating the trifocal tensor for three images or techniques based on the factorization algorithm or bundle adjustment for n images.

Alternatively, or in addition, other sensors, such as accelerometers, gyroscopes, magnetometers, or some combination thereof, can also be used to estimate the user's relative position. For example, when only motion/orientation sensors are used, it may be assumed that the absolute position of the user's head remains the same or substantially the same when the device is moved or its orientation changed. The motion and/or orientation of the device can be determined from the motion/orientation sensors, and the relative position of the user can be estimated from the data captured by the motion/orientation sensors based on the assumption that the user's absolute position remains the same. In other embodiments, image analysis techniques can be combined with approaches using motion/orientation sensors. These various approaches are discussed elsewhere herein or incorporated by reference herein.

After the relative position information of the user or the angle of the user's head with respect to the computing device is obtained, the relative position information or head angle can be compared to the reference point to determine whether the relative position or head angle is within a first specified range or inner angular range 1506, such as within the thresholds of a Peek Off state (e.g., ±9 degrees) or within the bounds of a neutral region (e.g., ±10 degrees from the reference point). If the relative position or detected angle of the user's head is determined to be within the first specified range or inner angular range, a second position of the reference point can be determined based on an elastic function of the relative position information and the reference point over time 1508. In an embodiment, the elastic function includes weighting a difference or delta of the detected head angle and a previous value of the reference point by an elastic factor such that the detected head angle and the reference point converge within a specified period of time. In an embodiment, the elastic factor is selected so that the reference point converges with the detected angle of the user's head in approximately 4 seconds.

If the relative position or the detected angle of the user's head is not within the first specified range or inner angular range, then the reference point becomes fixed and is not updated 1510. That is, the reference point is bound to a current value of the reference point. The relative position or the detected angle of the user's head can then be compared to a second specified range or intermediate angular range 1512, such as between the first specified range or inner angular range and a third specified range or outer angular range, or within the Continuous Peek state (e.g., between ±9 degrees and ±13.5 degrees). If the detected angle of the user's head is within the intermediate angular range, a proportional value of the head angle within the intermediate angular range can be determined and content can be rendered based on the proportional value 1514.

For instance, the rendered content can include alpha blending, based on the proportional value, of a first view of content that is initially displayed and a second view of the content when a full "peek" gesture is determined to be performed. In an embodiment, for example, if the detected head angle is measured to be 10.125 degrees or ¼ between the Peek Off and Peek On states, the content to be rendered can comprise an alpha blend of 75% of the first view of the content and 25% of the second view of the content; if the detected head angle is measured to be 11.25 degrees or ½ between the Peek Off and Peek On states, the rendered content can comprise an alpha blend at 50% of the first view of the content and 50% of the second view of the content; if the detected head angle is measured to be 12.375 degrees or ¾ between the Peek Off and Peek On states, the rendered content can comprise an alpha blend at 25% of the first view of the content and 75% of the second view of the content; etc. In another embodiment, the content can include one or more graphical elements that are scaled based on the proportional value. In yet another embodiment, the content can include one or more graphical elements that are animated based on the proportional value.

If the relative position information or the detected head angle is determined to be outside of the intermediate angular range or within a third specified range or outer angular range, such as beyond the thresholds of the Peek On state (e.g., ±13.5 degrees from the reference point), a specified action can be performed 1516. For example, the action can include displaying additional information, contextual information, or other associated information of initial content, as illustrated in the examples of FIGS. 13(*f*) and 14(*b*). After the action is performed, the relative position of the user or the angle of the user's head can continue to be detected. If the relative position of the user or the angle of the user falls back within the first specified range, it can be determined that the user intended to perform a second gesture based on the relative position of the user or angle of the user's head, and a second action corresponding to the second gesture can be performed. For instance, the second action can include reverting to the display of the initial content as illustrated in the examples of FIGS. 13(*c*) and 14(*a*).

Figure 16:
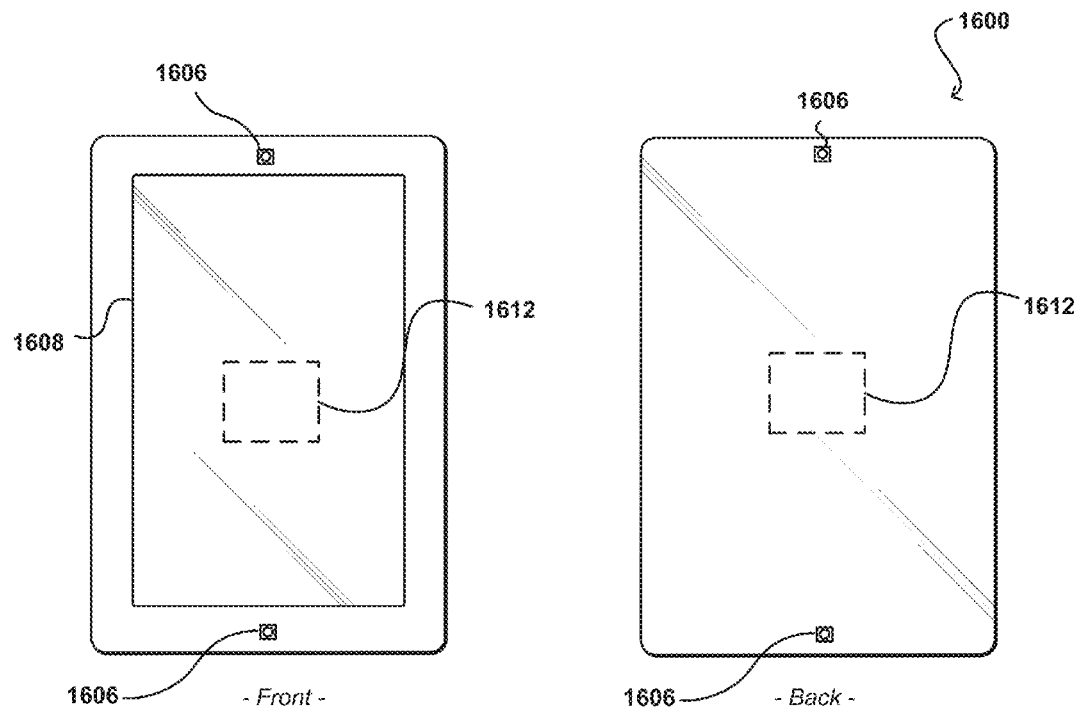
FIG. 16 illustrates an example of a computing device that can be used in accordance with various embodiments.

FIG. 16 illustrates an example computing device 1600 that can be used to perform approaches described in accordance with various embodiments. In this example, the device includes two cameras 1606 located at the top and bottom on each of a same and opposite side of the device as a display element 1608, and enabling the device to capture images in accordance with various embodiments. The computing device also includes an inertial measurement unit (IMU) 1612, comprising a three-axis gyroscope, three-axis accelerometer, and magnetometer that can be used to detect the motion and/or orientation of the device, and to facilitate head tracking in accordance with various embodiments.

Figure 17:
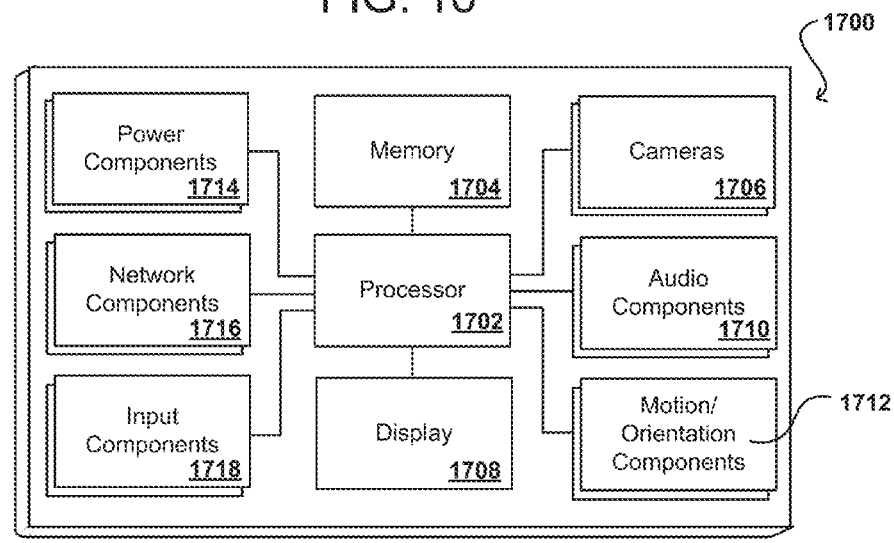
FIG. 17 illustrates an example configuration of components of a computing device such as that illustrated in FIG. 16.

FIG. 17 illustrates a logical arrangement of a set of general components of an example computing device 1700 such as the device 1600 described with respect to FIG. 16. In this example, the device includes a processor 1702 for executing instructions that can be stored in a memory component 1704. As would be apparent to one of ordinary skill in the art, the memory component can include many types of memory, data storage, or non-transitory computer-readable storage media, such as a first data storage for program instructions for execution by the processor 1702, a separate storage for images or data, a removable memory for sharing information with other devices, etc. The device typically will include some type of display element 1708, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 1706 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 1700 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 1714 known in the art for providing power to a computing device, which can include capacitive charging elements for use with a power pad or similar device. The computing device can include one or more communication elements or networking sub-systems 1716, such as a Wi-Fi, Bluetooth, RF, wired, or wireless communication system. The device in many embodiments can communicate with a network, such as the Internet, and may be able to communicate with other such devices. In some embodiments the device can include at least one additional input element 1718 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

The device 1700 also can include one or more orientation and/or motion sensors 1712. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1702, whereby the device can perform any of a number of actions described or suggested herein.

In some embodiments, the device 1700 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 1700 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 1700 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input component (e.g., a mouse, keyboard, controller, touch-sensitive display element or keypad) and at least one output device (e.g., a display device, printer or speaker). Such a system may also include one or more storage components, such as disk drives, optical storage devices and solid-state storage systems such as random access memory (RAM) or read-only memory (ROM), as well as removable media, memory cards, flash cards, etc.

Such devices can also include a computer-readable storage media reader, a communications component (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage systems or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a first position of a portion of the user with respect to a portion of the computing device, the first position corresponding to a first angular range relative to the computing device;
   displaying a first fillable electronic form that includes a first text field on a display screen of a computing device, wherein the first text field is configured to be populated based on user input;
   receiving user input to be entered into the first text field;
   determining that the first text field corresponds to an email address field;
   determining, based on the user input, that an email address was entered into the first text field;
   storing the user input associated with the email address field;
   displaying a second fillable electronic form that includes a second text field on the display screen;
   determining an angular displacement of the portion of the user with respect to the computing device from the first position to a second position, the second position corresponding to a second angular range relative to the computing device;
   determining that the second text field corresponds to the email address field;
   in response to determining that the portion of the user is located within the second angular range, displaying, on the display screen, the second fillable electronic form with a preview of the second text field being populated with the user input;
   determining that the user has selected a region on the display screen that is associated with pixels used to display the second text field; and
   entering, by the computing device, the user input into the second text field.

2. The computer-implemented method of claim 1, further comprising:
   after displaying the preview of the second text field being populated with the user input and in response to determining that the portion of the user is located within the first angular range, displaying the second text field without the preview of the second text field being populated with the user input.

3. The computer-implemented method of claim 1, wherein determining that the user has selected the region on the display screen that is associated with pixels used to display the second text field further comprises:
   determining that the user has selected the region during the preview of the second text field being populated with the user input.

4. A computing device, comprising:
   a display screen;
   at least one processor;
   memory including instructions that, when executed by the at least one processor, cause the computing device to perform the operations of:
      presenting, on the display screen, an electronic form that includes fillable field in a first state, wherein the field is configured to be populated based on user input;
      determining, while presenting the field in the first state, a first position of a portion of the user with respect to a portion of the computing device, the first position corresponding to a first angular range relative to the computing device;
      determining, after determining the first position and while presenting the field in the first state, a second position of the portion of the user with respect to the portion of the computing device, the second position corresponding to a second angular range relative to the computing device;
      determining an angular displacement of the portion of the user with respect to the computing device from the first position to the second position;
      presenting, on the display screen in response to determining the angular displacement and while the second position is determined, the field in a second state;
      detecting, while the field is presented in the second state, a touch of the display screen by the user; and
      continuing to present, in response to detecting the touch, the field in the second state after the second position is no longer determined.

5. The computing device of claim 4, wherein the instructions that cause the computing device to perform the operation of presenting the field in the second state further cause the computing device to perform the operations of:
   determining an input for the field based at least in part on an input previously provided by the user for the same field; and
   displaying the determined input in the field as an overlay.

6. The computing device of claim 4, wherein the instructions that cause the computing device to perform the operation of presenting the field in the second state further cause the computing device to perform the operations of:
   determining a type for the field;
   determining that the user has previously provided input for populating a second field that corresponds to the type for the field; and
   displaying, in the field, the input previously provided by the user for the second field as an overlay.

7. The computing device of claim 4, wherein the instructions that cause the computing device to perform the operation of presenting the field in the second state further cause the computing device to perform the operations of:
   determining a type for the field;
   determining user input previously provided by the user for the field corresponds to the determined type; and
   determining an input for the field based at least in part on the user input.

8. The computing device of claim 4, wherein the field in the first state is empty, and wherein the fillable field in the second state is populated.

9. The computing device of claim 4, wherein the memory further includes instructions that cause the computing device to perform the operations of:
   determining that the user has selected a region on the display screen that corresponds to a region in which the field is displayed in the second state, wherein the field in the second state is populated with preview data; and
   updating, in response to determining the selection, the field to permanently include the preview data.

10. The computing device of claim 9, wherein the memory further includes instructions that cause the computing device to perform the operation of:

displaying, after detecting the touch, the field in the second state when the portion of the user is located within the first angular range.

11. The computing device of claim 4, wherein the instruction that cause the computing device to perform the operation of presenting the field in a second state further cause the computing device to perform the operations of:

displaying, on the display screen, an overlay including a first option referencing a first input and a second option referencing a second input;

determining that the user has selected the first option referencing the first input; and displaying the first input in the field as an overlay.

12. The computing device of claim 11, wherein the instruction that cause the computing device to perform the operation of displaying the overlay including the first option referencing the first input and the second option referencing the second input further cause the computing device to perform the operations of:

determining the first input for the field based at least in part on an input previously provided by the user; and determining the second input for the field based at least in part on a different input previously provided by the user.

13. The computing device of claim 11, wherein the memory further includes instructions that cause the computing device to perform the operations of:

determining that the portion of the user is located within the first angular range;

displaying a second electronic form that includes a second field on the display screen;

determining that a type of the second field corresponds to a type of the field;

determining that the portion of the user is located within the second angular range; and displaying, on the display screen, the second electronic form with the second field in the second state.

14. The computing device of claim 4, wherein the instructions that cause the computing device to perform the operation of presenting the field in a second state further cause the computing device to perform the operations of:

presenting, on the display screen, an overlay including a first option referencing a first input and a second option referencing a second input;

determining that the user has selected the first option referencing the first input; and inputting the first input in the field.

15. A computing device, comprising:

a display screen;

at least one processor;

memory including instructions that, when executed by the at least one processor, cause the computing device to perform the operations of:

presenting, on the display screen, an electronic form that includes a first field;

determining while presenting the first field, a first position of a portion of the user with respect to a portion of the computing device, the first position corresponding to a first angular range relative to the computing device;

determining, after determining the first position and while presenting the first field, a second position of the portion of the user with respect to the portion of the computing device, the second position corresponding to a second angular range relative to the computing device;

determining an angular displacement of the portion of the user with respect to the computing device from the first position to the second position;

presenting, on the display screen in response to determining the angular displacement and while the second position is determined, an overlay of a menu referencing a first input and a second input, wherein the first field is able to be populated using the first input or the second input;

detecting, while the overlay is presented, a touch of the display screen by the user; and continuing to present, in response to detecting the touch, the overlay after the second position is no longer determined.

16. The computing device of claim 15, wherein the electronic form includes a second field, and wherein the memory further includes instructions that cause the computing device to perform the operations of:

determining that the user has selected a region, on the display screen, corresponding to the second field;

determining that the user has selected a region, on the display screen, corresponding to the first input; and displaying the first input in the second field.

17. The computing device of claim 15, wherein the instructions that cause the computing device to perform the operation of presenting the overlay further cause the computing device to perform the operations of:

determining a type of the first field;

determining that the first input was previously entered into a second field associated with the type; and determining that the second input was previously entered into a third field associated with the type.

18. The computing device of claim 15, wherein the overlay includes respective options for at least one of modifying or deleting the first input or the second input.

19. The computing device of claim 18, wherein the memory further includes instructions that cause the computing device to perform the operations of:

determining that the user has selected an option for modifying the first input;

receiving user input modifying the first input; and updating the overlay to include the modified first input.

* * * * *